(12) United States Patent
Nath et al.

(10) Patent No.: US 12,124,483 B2
(45) Date of Patent: Oct. 22, 2024

(54) DATA SEGMENTATION USING CLUSTERING

(71) Applicant: Oracle Financial Services Software Limited, Mumbai (IN)

(72) Inventors: Mridul Kumar Nath, Bangalore (IN); Shubham Negi, Mumbai (IN); Abhishek Anand, Bokaro Streel (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 14 days.

(21) Appl. No.: 18/181,831

(22) Filed: Mar. 10, 2023

(65) Prior Publication Data
US 2024/0303256 A1    Sep. 12, 2024

(51) Int. Cl.
*G06F 16/28*    (2019.01)

(52) U.S. Cl.
CPC ................ *G06F 16/287* (2019.01)

(58) Field of Classification Search
CPC .............................. G06F 16/28–287
See application file for complete search history.

(56) References Cited

U.S. PATENT DOCUMENTS

| | | | | |
|---|---|---|---|---|
| 9,779,205 | B2* | 10/2017 | Namir | G16B 50/10 |
| 10,832,822 | B1* | 11/2020 | Neumann | G16H 50/20 |
| 11,361,219 | B1* | 6/2022 | Bhattacharyya | G06V 40/15 |
| 2005/0050087 | A1* | 3/2005 | Milenova | G06F 16/285 |
| | | | | 707/999.102 |
| 2006/0005121 | A1* | 1/2006 | Berger | G06F 16/283 |
| | | | | 715/230 |
| 2007/0219990 | A1* | 9/2007 | Crivat | G06F 16/283 |
| 2010/0332474 | A1* | 12/2010 | Birdwell | G06Q 30/0185 |
| | | | | 707/E17.089 |

(Continued)

OTHER PUBLICATIONS

Cavallo et al., Clustrophile 2: Guided Visual Clustering Analysis, IEEE Transactions on Visualization and Computer Graphics ( vol. 25, Issue: 1, 2019, pp. 267-276) (Year: 2019).*

(Continued)

*Primary Examiner* — Robert W Beausoliel, Jr.
*Assistant Examiner* — Nirav K Khakhar
(74) *Attorney, Agent, or Firm* — Kilpatrick Townsend & Stockton LLP

(57) ABSTRACT

Method includes obtaining sample records from dataset associated with user and including records associated with identifiers customers of user; executing first clustering using sample records, to obtain first set of clusters for first identifiers associated with sample records, first clustering using features associated with first identifiers; providing visualization of first set of clusters; determining whether user input for optimizing first set of clusters provided in visualization is received; when user input for optimizing first set of clusters is not received, determining first information related to first set of clusters as final result information; when user input for optimizing first set of clusters is received: executing second clustering using sample records, to obtain second set of clusters for first identifiers, second clustering using features associated with first identifiers, and determining second information related to second set of clusters as final result information; and clustering entire dataset using final result information.

17 Claims, 16 Drawing Sheets

(56) References Cited

U.S. PATENT DOCUMENTS

| | | | | |
|---|---|---|---|---|
| 2013/0124525 A1* | 5/2013 | Anderson | ............. | G06F 16/278 707/737 |
| 2017/0011111 A1* | 1/2017 | Pallath | .................. | G06F 16/285 |
| 2018/0341695 A1* | 11/2018 | Goeser | ................ | G06F 16/2365 |
| 2019/0026648 A1* | 1/2019 | Da | ............................ | G06F 7/14 |
| 2020/0073953 A1* | 3/2020 | Kulkarni | ................ | G06N 3/084 |
| 2020/0104464 A1* | 4/2020 | Kaufman | ............... | G16B 30/00 |
| 2021/0019557 A1* | 1/2021 | Jothi | ................. | G06F 18/24137 |
| 2021/0133611 A1* | 5/2021 | Neumann | .............. | G06N 20/00 |
| 2021/0256406 A1* | 8/2021 | Mueller | .................... | G06N 7/01 |

OTHER PUBLICATIONS

"O-Cluster", Available Online at: https://docs.oracle.com/en/database/oracle/machine-learning/oml4sql/21/dmcon/o-cluster.html#GUID-4CA9F5BD-8CA4-41A0-88D7-8C85F2CB816F, Accessed from Internet on Mar. 8, 2023, pp. 1-6.

"Plotly Open Source Graphing Library for Python", Plotly Python Graphing Library, Available online at https://plotly.com/python/, Accessed from Internet on Mar. 15, 2023, 11 pages.

"Tkinter—Python Interface to Tcl/Tk", Python 3.11 .2 Documentation, Available Online at: https://docs.python.org/3/library/tkinter.html, Accessed from Internet on Mar. 2, 2023, pp. 1-15.

"Weka (Machine Learning)", Wikipedia, Accessed from Internet on Mar. 2, 2023, pp. 1-3.

Abichou, "Interactive Dashboard for Clustering Analysis with Streamlit, Bigquery ML and App Engine", The Startup, Available Online at: https://medium.com/swlh/interaclive-dashboard-for-clustering-analysis-with-streamlit-bigquery-ml-and-app-engine-b730fad9433, Dec. 14, 2020, pp. 1-10.

Adams, "K-Means Clustering and Related Algorithms", COS 324—Elements of Machine Learning, Princeton University, Nov. 2018, pp. 1-18.

Bierly, "12 Python Data Visualization Libraries to Explore for Business Analysis", Available Online at: https://mode.com/blog/python-data-visualization-libraries/, Oct. 22, 2021, pp. 1-18.

Borman, "The Expectation Maximization Algorithm A Short Tutorial", Available Online at: https://www.lri.fr/~sebag/COURS/EM_algorithm.pdf, Jul. 18, 2004, pp. 1-9.

Carvalho, "Visualizing Clusters with Python's Matplotlib", Towards Data Science, Accessed from Internet on Mar. 2, 2023, pp. 1-20.

Gupta, "Example of K-Means Clustering in Python with GUI", Available Online at: https://www.linkedin.com/pulse/example-k-means-clustering-python-gui-actively-looking-for-job-, Jun. 13, 2020, pp. 1-4.

Kwon et al., "Clustervision: Visual Supervision of Unsupervised Clustering", IEEE Transactions on Visualization and Computer Graphics, vol. 24, No. 1, Aug. 29, 2017, 10 pages.

Milenova et al., "O-Cluster: Scalable Clustering of Large High Dimensional Data Sets", IEEE International Conference on Data Mining, Feb. 2002, pp. 1-10.

Wasnik, "How to Plot K-Means Clusters with Python?", AskPython, Oct. 26, 2020, pp. 1-12.

West, Simple Random Sampling of Individual Items in the Absence of a Sampling Frame that Lists the Individuals, West New Zealand Journal of Forestry Science, 2016, 7 pages.

\* cited by examiner

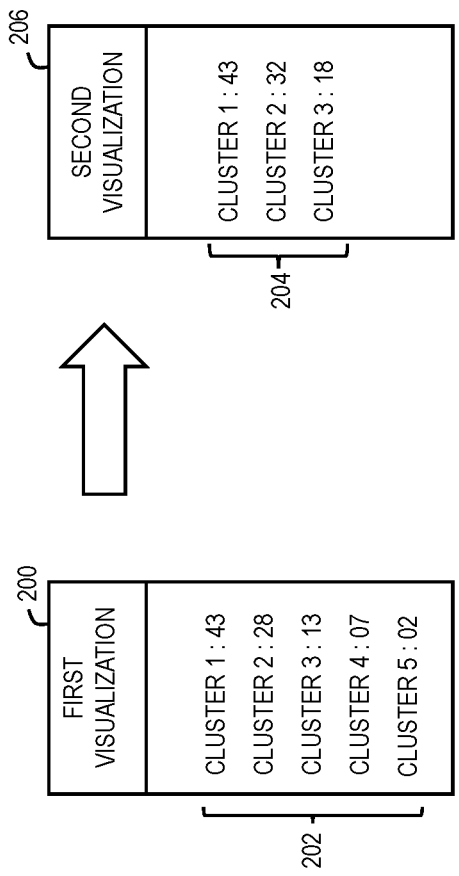

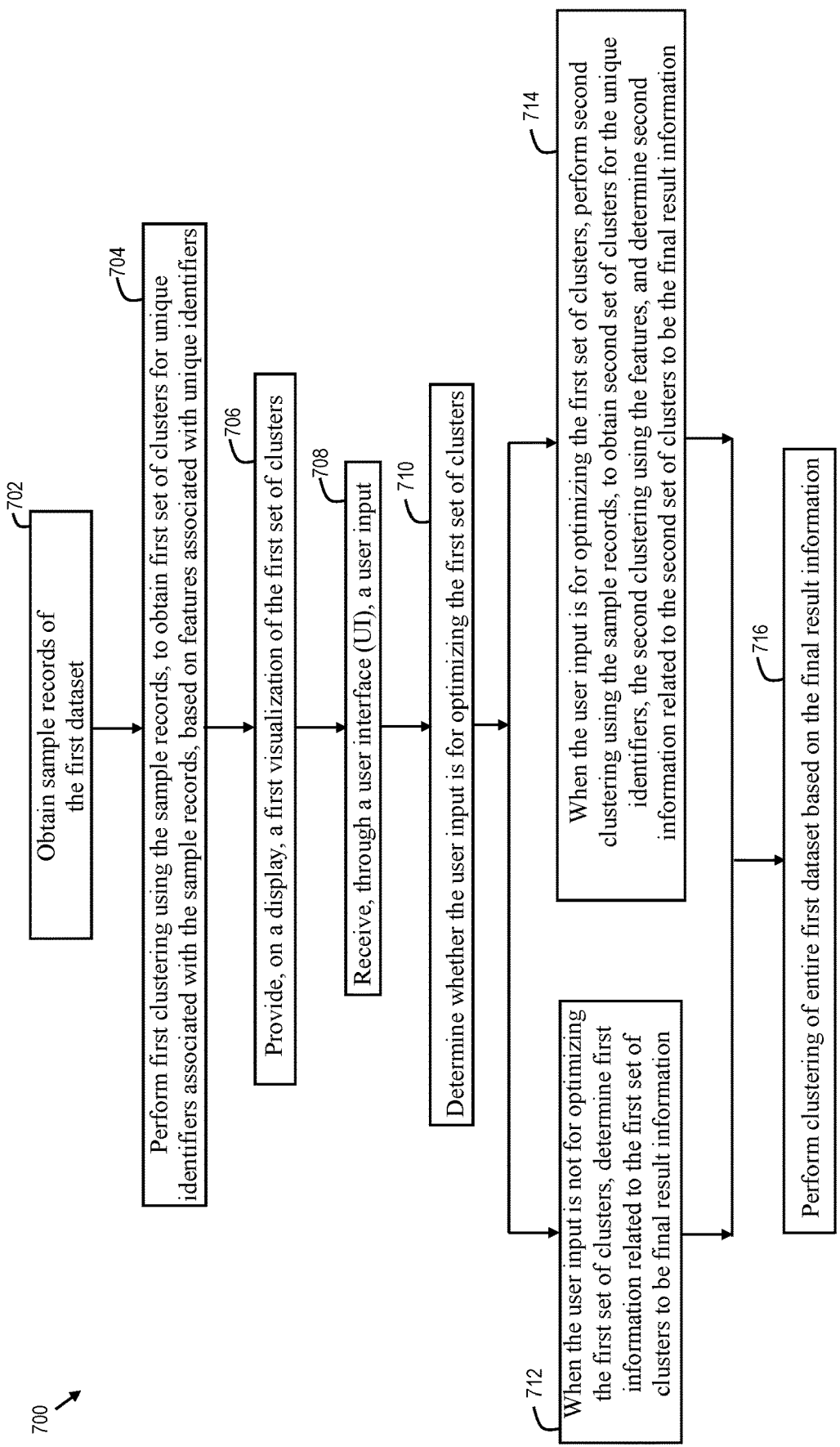

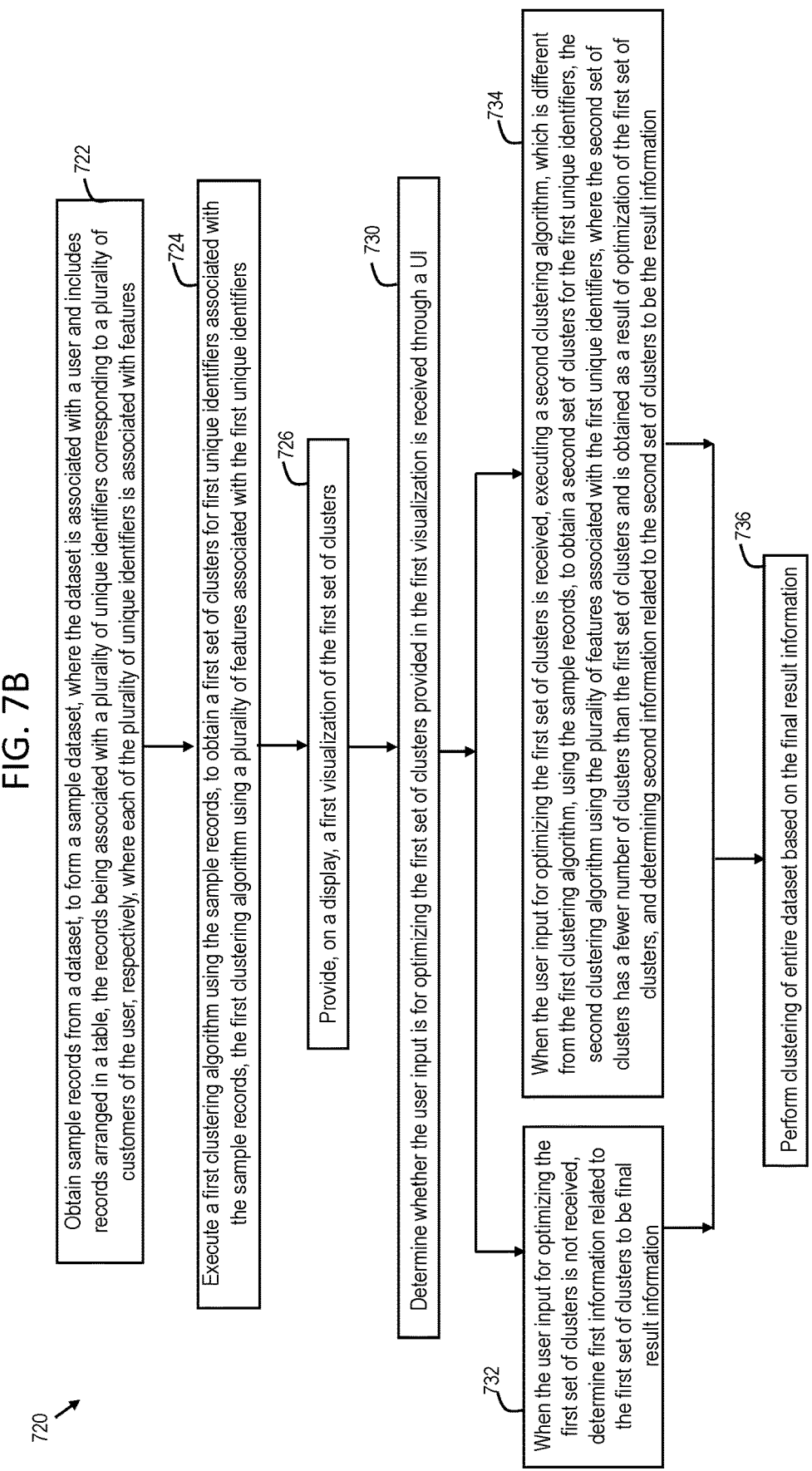

DATA SEGMENTATION USING CLUSTERING

FIELD

The present disclosure relates generally to artificial intelligence techniques, and more particularly, to data clustering using unsupervised machine learning where the derived clusters may be optimized.

BACKGROUND

Machine learning (ML) is an area of artificial intelligence (AI) where computers have the capability to learn without being explicitly programmed. There are different types of ML techniques including supervised learning techniques, unsupervised learning techniques, and others. In a supervised learning technique, an ML model is trained using training data, where the training data includes multiple training examples, each training example including an input and a known output corresponding to the input. In an unsupervised learning technique, an ML model or algorithm is provided with unlabeled data, and is tasked to analyze and find patterns in the unlabeled data. The examples of unsupervised learning technique are dimension reduction and clustering.

Data segmentation is the process of grouping similar data points together based on the similarity of data attributes or features. Data segmentation is useful for different applications in different domains, e.g., medical, financial, security, etc.

One approach for data segmentation is the threshold or rule-based approach, where a user selects a priori thresholds and divides the data points accordingly. However, this approach leads to very large variances among the data points found in each segment. Further, it is difficult to perform the segmentation in more than two dimensions.

Another approach is the unsupervised ML clustering, where the data points with similar features are assigned into clusters. For example, in the clustering, the ML model is tasked to segment the data points into a number of groups so that data points in the same group are more similar to other data points in the same group than those in other groups. The ML clustering has several advantages over the rule-based approach, e.g., the segmentation may be performed in multiple dimensions, and variances within each resulting cluster are very small.

However, the clustering models are very technical, driven solely by data, and, thus, the implementation of such models is not practical for an end user. For example, using the existing models, it is difficult for the end user to optimize the number of clusters to align with a particular task, problem or application that a particular end user attempts to solve by data segmentation.

SUMMARY

Techniques disclosed herein relate generally to using artificial intelligence techniques. More specifically and without limitation, techniques disclosed herein relate to a novel approach for data segmentation using unsupervised clustering methods on a sample dataset to generate a model that outputs an optimized number of clusters, where the model can then be applied to a larger dataset so that the larger dataset can be segmented by the generated model that can output the optimized number of clusters for the larger dataset. Various embodiments are described herein to illustrate various features. These embodiments include various methods, systems, non-transitory computer-readable storage media storing programs, code, or instructions executable by one or more processors, and the like.

In various embodiments, a computer-implemented method performed by a computer system is provided that includes obtaining sample records from a dataset, to form a sample dataset, where the dataset is associated with a user and includes records arranged in a table, the records being associated with a plurality of unique identifiers corresponding to a plurality of customers of the user, respectively, where each of the plurality of unique identifiers is associated with features; executing a first clustering algorithm using the sample records, to obtain a first set of clusters for first unique identifiers associated with the sample records among the plurality of unique identifiers, the first clustering algorithm using a plurality of features associated with the first unique identifiers; providing, on a display, a first visualization of the first set of clusters; determining whether a user input for optimizing the first set of clusters provided in the first visualization is received through a user interface (UI); when the user input for optimizing the first set of clusters is not received, determining first information related to the first set of clusters to be a final result information; when the user input for optimizing the first set of clusters is received: executing a second clustering algorithm, which is different from the first clustering algorithm, using the sample records, to obtain a second set of clusters for the first unique identifiers, the second clustering algorithm using the plurality of features associated with the first unique identifiers, where the second set of clusters has a fewer number of clusters than the first set of clusters and is obtained as a result of optimization of the first set of clusters, and determining second information related to the second set of clusters to be the final result information; and clustering an entirety of the dataset based on the final result information.

In some embodiments, the clustering the entirety of the dataset based on the final result information includes: when the user input for optimizing the first set of clusters is not received, applying the first clustering algorithm on the entirety of the dataset, where an application of the first clustering algorithm on the entirety of the dataset replicates an application of the first clustering algorithm on the sample dataset; and when the user input for optimizing the first set of clusters is received, applying the second clustering algorithm on the entirety of the dataset, where an application of the second clustering algorithm on the entirety of the dataset replicates an application of the second clustering algorithm on the sample dataset.

In some embodiments, the executing the first clustering algorithm further includes: identifying whether the sample dataset includes a nested table; based on the identifying the nested table, applying expectation-maximization clustering algorithm on the sample records; and based on the identifying no nested table, applying O-cluster algorithm on the sample records.

In some embodiments, the providing the first visualization further includes receiving, through the UI, the user input that provides a number K, the determining whether the user input for optimizing the first set of clusters is received further includes determining that the user input is received for optimizing the first set of clusters based on the number K, and the executing the second clustering algorithm includes applying K-means clustering using the number K.

In some embodiments, the receiving the user input and the applying the K-means clustering are iteratively performed, and, for each iteration, the computer-implemented method further includes: receiving a number K, via the user input, the number K being different for each iteration, obtaining a number of clusters for the second set of clusters based on the number K input for a corresponding iteration, and providing, on the display, a second visualization of the second set of clusters.

In some embodiments, the method may further include: for each iteration, determining whether a user input for optimizing the second set of clusters provided in the second visualization is received through the UI; when the user input for optimizing the second set of clusters is received, applying the K-means clustering on the sample records using a number K provided for a current iteration, and providing, on the display, the second visualization of the second set of clusters that is obtained in the current iteration; and when the user input for optimizing the second set of clusters is not received, determining the second information related to the second set of clusters that is obtained in a most recent iteration to be the final result information.

In some embodiments, the method may further include: determining the second set of clusters obtained in a particular iteration as a final version of the second set of clusters, where: each cluster of the second set of clusters of the final version includes a number of the first unique identifiers, the number of the first unique identifiers is optimized for each cluster of the second set of clusters of the final version to be approximately a same number, and the second clustering algorithm applied to the entirety of the dataset replicates an application of the second clustering algorithm on the sample dataset so that a number of the plurality of unique identifiers in each cluster is approximately the same.

Some embodiments of the present disclosure include a system including one or more data processors. In some embodiments, the system includes a non-transitory computer-readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 2 illustrates an example of a first visualization and a second visualization, according to various embodiments.

FIG. 7A depicts processing performed by the data segmentation system according to various embodiments.

FIG. 7B depicts processing performed by the data segmentation system according to various embodiments.

DETAILED DESCRIPTION

Figure 1A:
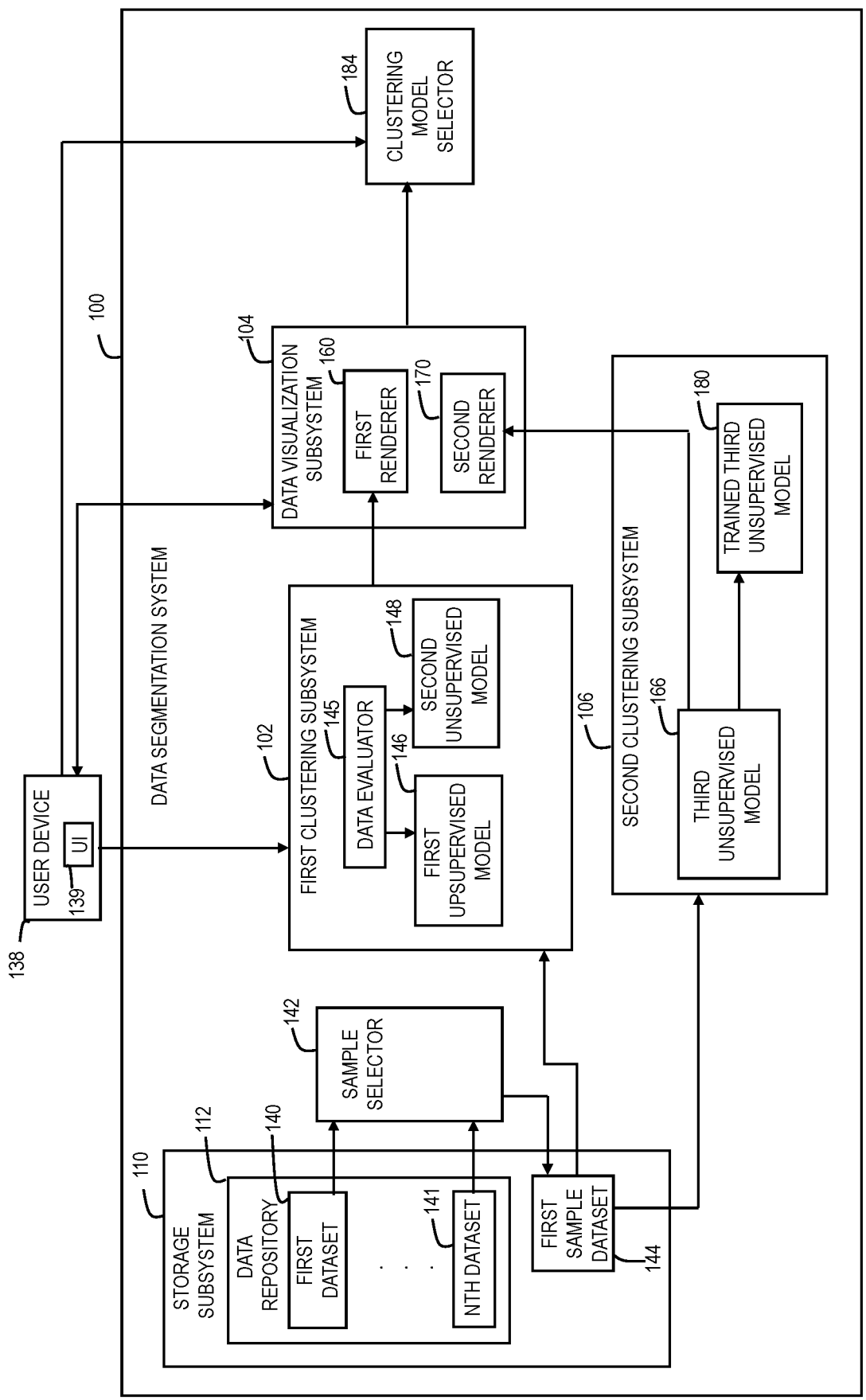
FIG. 1A is a simplified block diagram of a data segmentation system according to various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

I. INTRODUCTION

The present disclosure relates generally to using artificial intelligence techniques. More specifically and without limitation, techniques disclosed herein relate to a novel approach for data segmentation using unsupervised clustering methods on a sample dataset to generate a model that outputs an optimized number of clusters, where the model can then be applied to a larger dataset so that the larger dataset can be segmented by the generated model that can output the optimized number of clusters for the larger dataset.

Clustering refers to a data mining technique that groups unlabeled data based on their similarities or differences. Clustering algorithms are used to process raw, unclassified data objects into groups represented by structures or patterns in the information. Grouping similar entities together help profile the attributes, e.g., features, of different groups. In other words, it provides insight into underlying patterns of different groups. There are many applications of grouping unlabeled data, for example, identification of different groups/segments of customers and marketing each group in a different way to maximize the revenue. Another example is grouping documents together that belong to the similar topic, etc.

One approach for clustering is the threshold or rule-based approach, where a user selects a priori thresholds and divides the data points accordingly. However, this approach leads to very large variances among the data points found in each segment. Further, it is difficult to perform the segmentation in more than two dimensions.

Another approach is the unsupervised ML clustering, where the data points with similar features are assigned into clusters. For example, in the clustering, the ML model is tasked to segment the data points into a number of groups so that data points in the same group are more similar to other data points in the same group than those in other groups. The ML clustering has several advantages over the rule-based approach, e.g., the segmentation may be performed in multiple dimensions, and variances within each resulting cluster are very small.

ML clustering is entirely driven by data. As an example, a customer having a monthly average balance of USD 100,000 may be categorized as an individual from a perspective of the business owner, while a corporate customer having a monthly average balance of USD 125,000 may be categorized as corporate. From an ML data segmentation or clustering perspective, these two customers may be clustered together into a single cluster based on their monthly average balance being within the same or substantially similar range.

Segmenting the data into clusters that are optimized per a user objective using the ML unsupervised clustering is a non-trivial task that cannot be practically performed by the end user who is not fluent in data science.

One solution may be cluster visualization that allows for visualization of clusters where the clusters of the segmented data can be observed, evaluated, and/or tweaked. For example, the cluster visualization mechanisms can be used as a part of the widely accepted machine learning language, python, as libraries. Additionally, some of the cluster visualization mechanisms are consolidated into various visual analytics tools.

However, it is problematic for the end users to use the libraries and/or the visual analytics tools. For example, the tools are highly technical in nature and require the users to know python, to be able to utilize the visualization libraries. Further, the available tools are isolated analytical solutions that may be used for understanding data as a part of individual research by the data scientists; however, it is difficult to use the tools on a large-scale data mining use case.

As such, the related art techniques are highly impractical and sometimes impossible to use in many situations.

The techniques described herein overcome the above-mentioned problems and other problems.

In various embodiments, the described techniques may obtain a sample (e.g., a sample dataset) of the dataset consisting of uniquely identifiable records. First clustering using the sample dataset may be performed, to obtain first set of clusters consisting of unique identifiers, e.g., data points, associated with customers of a user, based on features associated with the unique identifiers, e.g., the features associated with the data points. The system then may provide a first visualization of the first set of clusters for evaluation by a user and may receive a user input related to the evaluation, e.g., for optimizing the first set of clusters displayed on the display and providing the number of desired clusters.

Based on the user input, second clustering can be performed on the sample dataset, to obtain the second set of clusters consisting of unique identifiers, based on the number of clusters adjusted by the user input and based on the features associated with the unique identifiers, so that the second set of clusters includes fewer clusters than the first set of clusters and is obtained as a result of optimization of the first set of clusters. The system then may provide a second visualization of the second set of clusters for evaluation by a user. If the user is satisfied with how the data is segmented, the processing of the sample dataset can end. Otherwise, the user can provide a different number K of clusters, and the processing can be iteratively performed until the user is satisfied with how the data of the sample dataset is segmented.

Relevant information may be output, thereby the data segmentation may be then performed on the entire dataset, where the data segmentation may replicate an application of the second clustering to obtain the optimized number of clusters for the entire dataset.

In various embodiments, the described techniques can provide cluster visualization and optimization of clusters for the users desiring to perform data clustering but not having the technical skills, by first processing the sample dataset, provided by the user, where one of the clustering algorithms is selected based on whether a nested table is present in the sample dataset, and providing to the user the hierarchal splitting rules based on which the user's data may be clustered. As a next step, the described techniques accept a user input for segmenting the sample dataset into a particular number of clusters as required for the user's task. Thus, first, the user can operate the system to obtain the final clusters of sample data and cluster visualization on the sample dataset without knowledge of technical libraries, tools, or specialized programming language(s). Then, the system can use information obtained from the processing of the sample dataset to perform data segmentation of the entire dataset, where the clustering algorithm applied to obtain the final clusters is used for the clustering on the entire dataset.

As a result of the processing performed on the sample dataset, the data clusters for a smaller amount of data may be obtained that satisfy the user's task, before the commencement of the clustering on the entire dataset. This improves the functioning of the computer by reducing computational resources, since the selection of the clustering algorithm and the parameters for the clustering algorithm are determined at an earlier stage on the sample data.

In various embodiments, the described techniques allow the user to obtain a customized segmentation of data depending on the user's preferences and business needs.

In various embodiments, the described techniques allow the user to choose the finalized version of the number of clusters.

II. DATA SEGMENTATION SYSTEM

FIG. 1A is a simplified block diagram of a data segmentation system 100 according to certain embodiments. The data segmentation system 100 may be implemented using one or more computer systems, each computer system having one or more processors. The data segmentation system 100 may include multiple components and subsystems communicatively coupled to each other via one or more communication mechanisms. For example, in the embodiment depicted in FIG. 1A, the data segmentation system 100 includes a first clustering subsystem 102, a data visualization subsystem 104, and a second clustering subsystem 106. These subsystems may be implemented as one or more computer systems. The systems, subsystems, and other components depicted in FIG. 1A may be implemented in software (e.g., code, instructions, program) executed by one or more processing units (e.g., processors, cores) of the respective systems, using hardware, or combinations thereof. The software may be stored on a non-transitory storage medium (e.g., on a memory device).

The data segmentation system 100 depicted in FIG. 1A is merely an example and is not intended to unduly limit the scope of embodiments. Many variations, alternatives, and modifications are possible. For example, in some implementations, the data segmentation system 100 may have more or fewer subsystems or components than those shown in FIG. 1A, may combine two or more subsystems, or may have a different configuration or arrangement of subsystems. The data segmentation system 100 and subsystems depicted in FIG. 1A may be implemented using one or more computer systems, such as the computer system depicted in FIG. 13.

As shown in FIG. 1A, the data segmentation system 100 also includes a storage subsystem 110 that may store the various data constructs and programs used by the data segmentation system 100. For example, the storage subsystem 110 may store data repository 112 used by the data segmentation system 100. However, this is not intended to be limiting. In alternative implementations, the data repository 112 may be stored in other memory storage locations (e.g., different databases) that are accessible to the data segmentation system 100, where these memory storage locations can be local to or remote from the data segmentation system 100. In addition to the data repository 112, other data used by the data segmentation system 100 or generated by the data segmentation system 100 as a part of its functioning may be stored in the storage subsystem 110. For example, versions of clusters and their associated information, segmentation rules, and/or thresholds may be stored in the storage subsystem 110.

For example, the data of the data repository 112 may be collected by one or more users over time and made available to the storage subsystem 110 and/or the data segmentation system 100. For example, the data in the data repository 112 may be stored as datasets where each dataset is associated with a user identifier (ID). Each dataset may contain one or more tables containing records, where each record is associated with a unique ID, e.g., a customer ID. As used herein, a user is an entity that uses a user computer to interact with the data segmentation system 100. A customer is an entity that is a customer of the user. The entity may be an individual or an organization.

As described in detail below, the data segmentation system 100 clusters the sample dataset, e.g., sample unique identifiers associated with the records of the sample dataset into a number of clusters based on data point features, e.g., features associated with the unique identifiers, using a selected clustering algorithm. The processing performed by the data segmentation system 100 may include optimization of the number of clusters. The selected clustering algorithm and the optimized number of clusters are then used to cluster the entire dataset into similar clusters. For example, in the clustering of the entire dataset of the user, the data segmentation system 100 can replicate the clustering that has been performed on the sample dataset obtained by sampling the entire dataset.

Figure 1B:
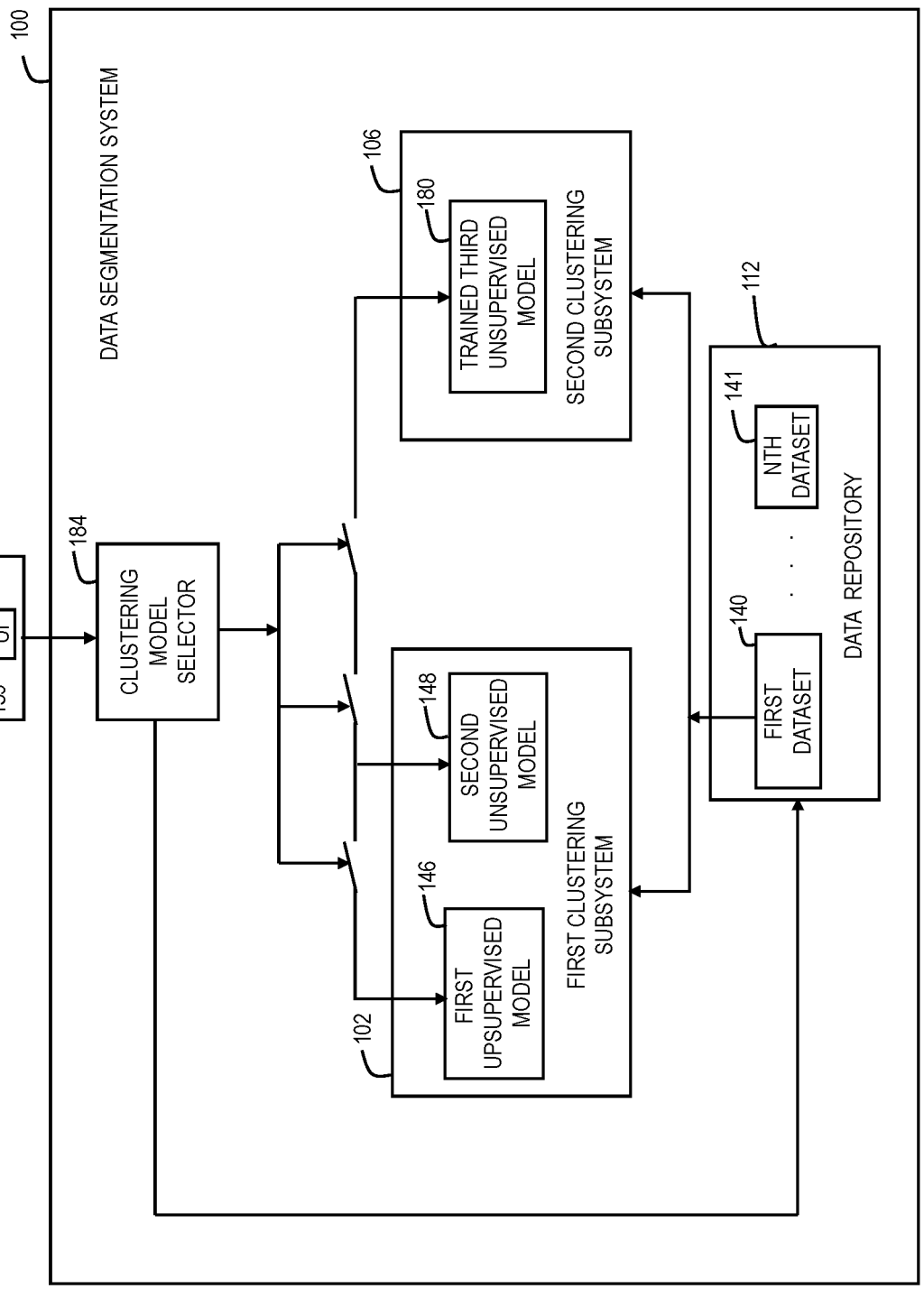
FIG. 1B is a simplified block diagram of the data segmentation system according to various embodiments.
Figure 1C:
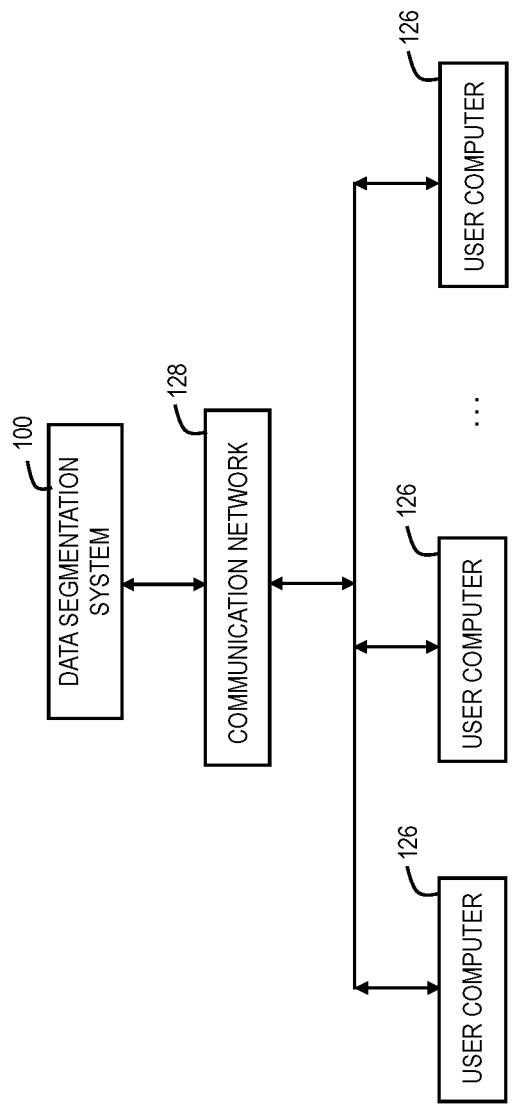
FIG. 1C is a simplified block diagram of a data segmentation system in a distributed computing environment according to various embodiments.
Figure 12:
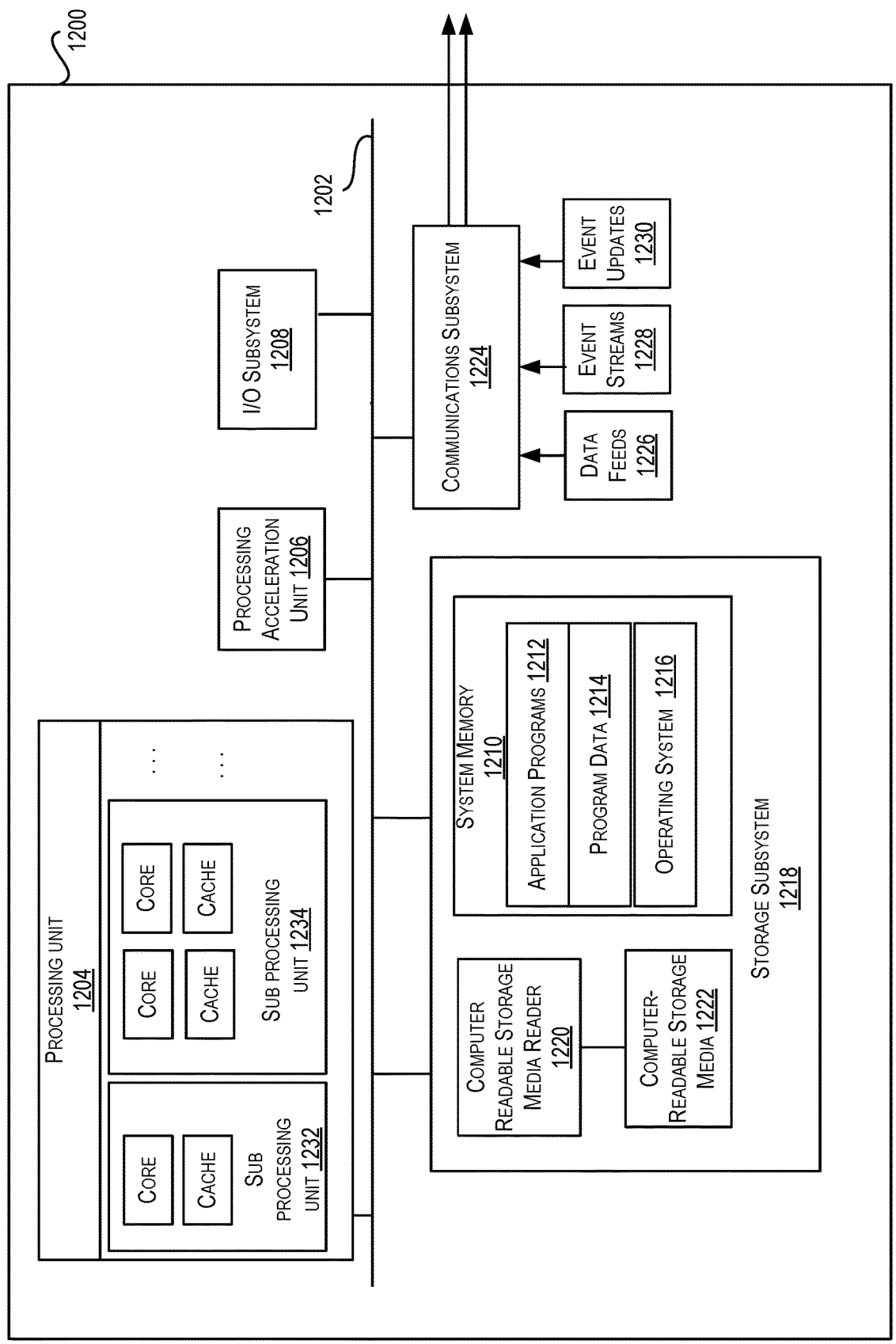
FIG. 12 is a block diagram illustrating an example computer system, according to at least one embodiment.

As shown in FIG. 1C, the data segmentation system 100 can be provided as a part of a distributed computing environment, where the data segmentation system 100 is connected to one or more user computers 126 via a communication network 128. An example of a distributed computing environment is depicted in FIG. 12 and described in detail below.

Figure 1D:
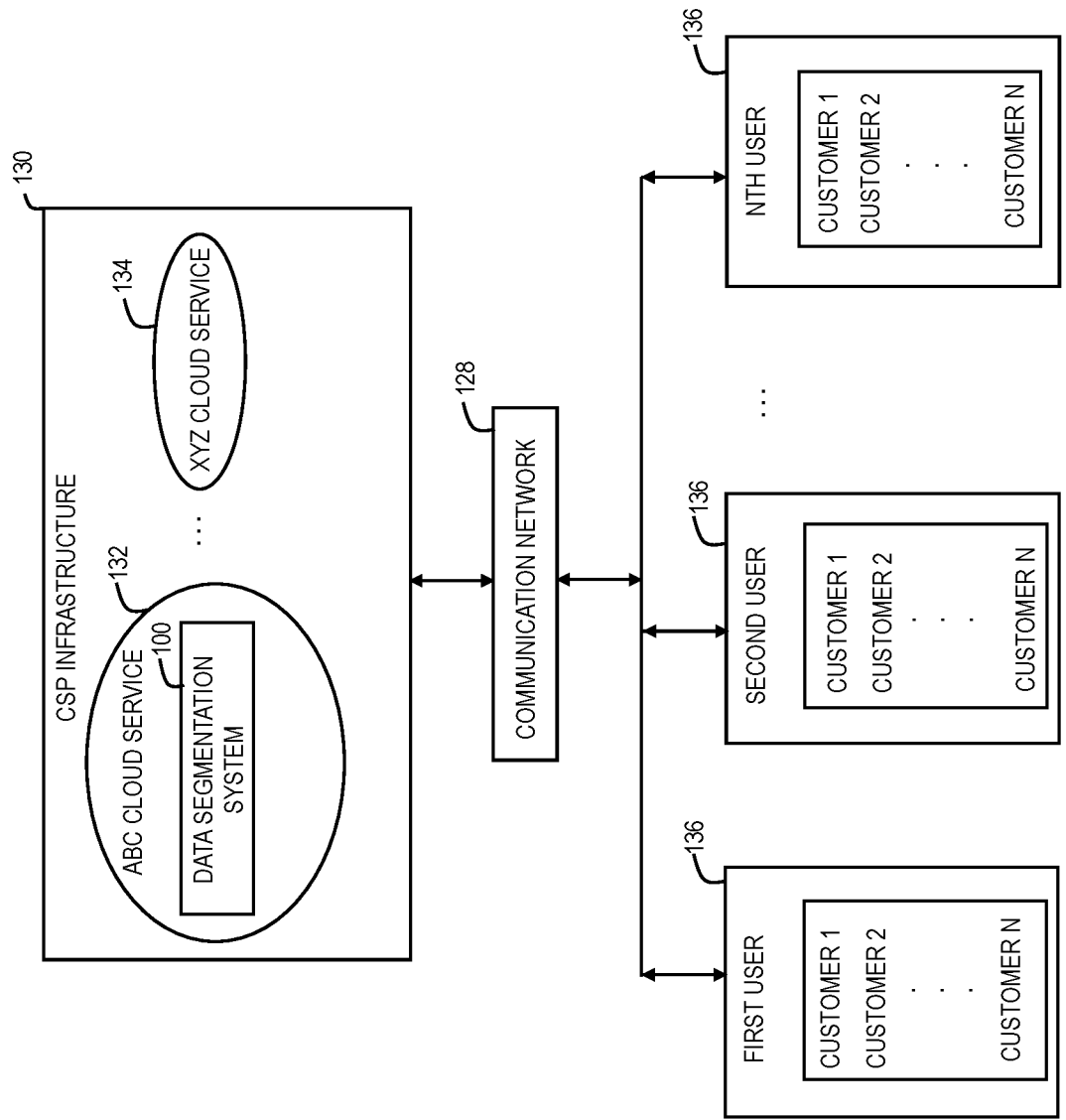
FIG. 1D is a simplified block diagram of a data segmentation system in a cloud service provider (CSP) infrastructure according to various embodiments.

As shown in FIG. 1D, the data segmentation system 100 may be a part of a CSP infrastructure 130 provided by a CSP for providing one or more cloud services. For example, the one or more cloud services may include ABC cloud service 132 to XYZ cloud service 134 connected to computers of one or more users 136 via a communication network 128. For example, the data segmentation system 100 may be a part of the ABC cloud service 132.

An example of a cloud infrastructure architecture provided by the CSP is depicted in FIGS. 8-11 and described in detail below.

A. First Clustering

As described in detail below, the data segmentation system 100 clusters the unique identifiers associated with the records stored in the data repository 112 into first set of clusters based on features associated with the unique identifiers. The first set of clusters are then used to provide a first visualization that is used to optimize the number of clusters as per a task of a user.

In an example depicted in FIG. 1A, the data segmentation system 100 may receive a user input for initiating data segmentation, e.g., clustering, from a user device 138, e.g., via a user interface (UI) 139. For example, the UI 139 may include a touchscreen that serves as a display and a user input device. However, this is not intended to be limiting. In some embodiments, the UI 139 may include separated display and user input device, or the display and the user input device may be provided in different devices.

With continuing reference to FIG. 1A, the first clustering subsystem 102 performs an unsupervised clustering, e.g., an unsupervised machine learning. Clustering involves grouping a set of objects into classes of similar objects.

As an example, the data repository 112 may include one or more datasets, e.g., one or more among a first dataset 140 representing a use case to an Nth dataset 141 representing another use case. For example, the data repository 112 may include datasets associated with different criteria, e.g., different features or attributes, that are obtained from the different users and/or the same user. For example, the datasets of the same user may include one dataset including customer profile data and the other dataset including financial transaction details of corporate customers.

In embodiments, where the data repository 112 stored in the storage subsystem 110 or obtained by the data segmentation system 100 includes more than one dataset, the data segmentation system 100 performs processing on any of the first dataset 140 to the Nth dataset 141, partially in parallel, in parallel, or successively. For convenience of description, embodiments are described below for one dataset included in the data repository 112, e.g., the first dataset 140. It noted that the description of the novel techniques of various embodiments is applicable to any dataset of the data repository 112.

In some implementations, the data segmentation system 100 includes a sample selector 142. The sample selector 142 is configured to select, from the first dataset 140, a first sample dataset 144. As a non-limiting example, the first dataset 140 may include 1,000,000 records organized in a table having rows and columns. The sample selector 142 can select, from the first dataset 140, a representative numbers of samples by using one of statistical random sampling techniques. As a non-limiting example, the sample selector 142 can select 1000 records, e.g., obtain the data, the size of which is 1000 times smaller than the size of the data included in the entire dataset provided by the user. However, this is not intended to be limiting and the sample selector 142 can select any other number of sample records to be included in the first sample dataset 144.

The first sample dataset 144 can be then provided to the first clustering subsystem 102 and/or stored in the storage subsystem 110.

The first clustering subsystem 102 may include a data evaluator 145. The data evaluator 145 receives the first sample dataset 144 and evaluates the data of the first sample dataset 144, to determine which clustering algorithm to use based on whether the first sample dataset 144 is a nested table, as described in detail below.

In certain implementations, the data evaluator 145 includes a validation routine, e.g., a validation algorithm, that detects whether the first sample dataset 144 is a nested table. For example, the data evaluator 145 can determine whether a table existing in the data of the first sample dataset 144 includes a nested column having a header and at least one sub-header. The data evaluator 145 classifies such table as a nested table and all other tables as normal tables.

If the data evaluator 145 determines that the first sample dataset 144 is a nested table, the data evaluator 145 classifies the first sample dataset 144 into a first category. If the data evaluator 145 determines that the first sample dataset 144 has no nested table, the data evaluator 145 classifies the first sample dataset 144 as a normal table, e.g., classifies the first sample dataset 144 into a second category.

In some embodiments, the first clustering subsystem 102 can include a first unsupervised model 146, to segment the unique identifiers of the first sample dataset 144 that is classified to have a nested table. In some instances, the first unsupervised model 146 segments the unique identifiers of the first sample dataset 144 using expectation-maximization (EM) clustering algorithm that supports nested tables.

The EM or Expectation Maximization clustering algorithm is an approach for performing maximum likelihood estimation in the presence of latent variables. The EM clustering algorithm does this by first estimating the values for the latent variables, then optimizing the parameters of the model to best explain the data, then repeating these two steps until convergence.

The EM clustering can use Gaussian mixture models (GMMs). GMMs assume that the data points are Gaussian distributed and can use two parameters to describe the shape of the clusters: the mean and the standard deviation. Each Gaussian distribution is assigned to a single cluster. There are a number of techniques for estimating the parameters for a GMM, including maximum likelihood estimate which can be implemented using the EM clustering approach.

The first unsupervised model 146 can select a number of clusters for the unique identifiers and randomly initialize the Gaussian distribution parameters for each cluster, and compute the probability that each data point belongs to a particular cluster. The closer a point is to the Gaussian's center, the more likely it belongs to that cluster. Based on the probabilities, a new set of parameters is computed for the Gaussian distributions such that the probabilities of data points within the clusters are maximized. The new parameters may be computed using a weighted sum of the data point positions, where the weights are the probabilities of the data point belonging in that particular cluster. These steps are repeated iteratively until convergence, where the distributions do not change much from iteration to iteration.

In some embodiments, the first clustering subsystem 102 can further include a second unsupervised model 148, to segment the unique identifiers associated with the first sample dataset 144 classified to have a normal table. For instance, the second unsupervised model 148 segments the unique identifiers of the first sample dataset 144 using Orthogonal Partitioning Clustering (O-cluster).

O-Cluster or Orthogonal Partitioning Clustering is an Oracle-proprietary Clustering algorithm can produce high quality clusters without relying on user-defined parameters. The objective of O-Cluster is to identify areas of high density in the data and separate the dense areas into clusters. It uses axis-parallel unidimensional (orthogonal) data projections to identify the areas of density. The algorithm looks for splitting points that result in distinct clusters that do not overlap and are balanced in size. O-Cluster operates recursively by creating a binary tree hierarchy. The number of leaf clusters is determined automatically.

Partitioning strategy is a process of discovering areas of density in the attribute histograms. The process differs for numerical and categorical data. When both are present in the data, the algorithm performs the searches separately and then compares the results. In choosing a partition, the algorithm balances two objectives: finding well separated clusters, and creating clusters that are balanced in size.

In partitioning numerical attributes, to find the best valid cutting plane, O-Cluster searches the attribute histograms for bins of low density (valleys) between bins of high density (peaks). O-Cluster attempts to find a pair of peaks with a valley between them where the difference between the peak and valley histogram counts is statistically significant.

Categorical values do not have an intrinsic order associated with them. Therefore, it is impossible to apply the notion of histogram peaks and valleys that is used to partition numerical values. Instead, the counts of individual values form a histogram. Bins with large counts are interpreted as regions with high density. The clustering objective is to separate these high-density areas and effectively decrease the entropy (randomness) of the data.

The O-Cluster algorithm evaluates possible splitting points for all projections in a partition, selects the best one, and splits the data into two new partitions. The algorithm proceeds by searching for good cutting planes inside the newly created partitions. Thus, O-Cluster creates a binary tree structure that divides the input space into rectangular regions with no overlaps or gaps.

As a result of the processing performed by the first unsupervised model 146 or the second unsupervised model 148, the first clustering subsystem 102 outputs first set of clusters that are then input to the data visualization subsystem 104.

In certain implementations, the data visualization subsystem 104 can include a first renderer 160. The first renderer 160 receives the first set of clusters and associated data from the first clustering subsystem 102. The first renderer 160 then performs processing on the first set of clusters and associated data and generates a first visualization corresponding to the first set of clusters. The first visualization may be an interactive graphical user interface (GUI) and is described below in more detail with reference to FIGS. 2 and 3. As an example, the first visualization may be displayed on the UI 139 for an evaluation by the user.

Upon evaluation of the first visualization, the user may provide a user input through the UI 139. For example, the user input may indicate to perform optimization for the first set of clusters. As another example, the user input may indicate to terminate processing. Optionally, the user does not provide any input. In this case, the processing is terminated based on a time period being elapsed.

If the processing is terminated, the data segmentation system 100 considers the first set of clusters to be the final set of clusters. The data visualization subsystem 104 may output the final result information related to the first set of clusters of the particular version.

In certain implementations, the data segmentation system 100 may transmit the final result information related to the first set of clusters to a computer system of a user who provided the first dataset 140. Optionally, the final result information related to the first set of clusters and any other associated may be stored in the storage subsystem 110.

In certain implementations, when the final result information related to the first set of clusters is obtained, the clustering may be applied on an entirety of the first dataset 140, e.g., the data segmentation may be performed where the unique identifiers are clustered according to the clustering performed by the first clustering subsystem 102, as described above. Further, upon receiving the associated information, the visualization of the final clusters obtained by performing the data segmentation, e.g., the first clustering on the entirety of the first dataset 140, may be generated and displayed on a display of the user's computer system. An application of the clustering on the entire dataset is described in a greater detail below with reference to FIG. 1B.

In certain embodiments, where the user input indicates to perform optimization for the first set of clusters, the processing proceeds to the second clustering, as described below.

A. Second Clustering

As mentioned above, when the first visualization is displayed on the UI 139, the first visualization is subjected to the evaluation by the user. If the user is not satisfied with how the unique identifiers associated with the first sample dataset 144 are segmented by the first clustering subsystem 102, the user may provide the user input through the UI 139 that indicates to perform optimization for the first set of clusters.

In certain implementations, the second clustering subsystem 106 can include a third unsupervised model 166 to cluster the unique identifiers associated with the first sample dataset 144 based on features associated with the unique identifiers, in response to receiving the user input for optimizing the first set of clusters. In some instances, the third unsupervised model 166 may use a K-means clustering to cluster the unique identifiers associated with the first sample dataset 144 based on receiving a number K, which is the number of clusters that is provided via the user input.

K-means clustering is the unsupervised learning process that can operate based on a distance, such as a Euclidean distance, between the data points and their respective clusters. The distance may be a measure of similarity, e.g., the smaller the distance between two data points, the more similar the data points may be. In some embodiments, the data segmentation system 100 may use other distance measures of similarity.

The unsupervised learning process, e.g., K-means clustering, can optimize, or locally optimize, the clusters such that the data points best match their respective clusters.

As a result of the processing performed by the third unsupervised model 166, the second clustering subsystem 106 outputs the second set of clusters that are then input to the data visualization subsystem 104.

In certain implementations, the data visualization subsystem 104 may include a second renderer 170. The second renderer 170 receives the second set of clusters and associated data from the second clustering subsystem 106. The second renderer 170 then performs processing on the second set of clusters and associated data, and generates a second visualization corresponding to the second set of clusters. The second visualization may be an interactive GUI and is described below in more detail with reference to FIGS. 2 and 4. As an example, the second visualization may be displayed on the UI 139 for an evaluation by the user.

If the user is not satisfied with how the unique identifiers associated with the first sample dataset 144 are segmented by the second clustering subsystem 106, the user may provide the user input through the UI 139 that indicates to continue the processing. For example, the user may provide a different number K to be used in the K-means clustering performed by the third unsupervised model 166 to cluster the unique identifiers associated with the first sample dataset 144. E.g., in certain implementations, the optimization of the second set of clusters may be iteratively performed, by using a number K that is adjusted by the user for each iteration.

Accordingly, in each iteration, the third unsupervised model 166 clusters the unique identifiers associated with the first sample dataset 144 using K-means clustering into a number K of clusters that is provided by the user. As a result of each clustering iteration performed by the third unsupervised model 166, a version of the second set of clusters is generated. The second renderer 170 then performs processing on the second set of clusters of generated version and associated data, and generates a corresponding version of the second visualization. The second visualization of the iteration may be displayed on the UI 139 for the evaluation by the user.

When the user is satisfied with how the unique identifiers associated with the first sample dataset 144 are segmented by the second clustering subsystem 106, the user may determine the second set of clusters of the particular version to be the final clusters. The data visualization subsystem 104 may output the final result information related to the second set of clusters of the particular version. For instance, a version of the third unsupervised model 166 that provided an output of the final clusters may be considered to be a trained third unsupervised model 180 and stored for the future use. In some embodiments, the final result information related to the second set of clusters and/or the trained third unsupervised model 180 may be stored in the storage subsystem 110.

In certain implementations, the data segmentation system 100 may output the final result information related to the second set of clusters of the particular version and/or corresponding second visualization to a computer system of a user who provided the first dataset 140. For example, the data segmentation system 100 may transmit the second visualization of the particular version as the final visualization with associated information. Optionally, the trained third unsupervised model 180 may be also transmitted to the computer system of the user who provided the first dataset 140.

As mentioned above, the same or a different user may provide another dataset for clustering, e.g., the Nth dataset 141 containing records different from the records of the first dataset 140. In this case, the data segmentation system 100 may output final result information related to the final set of clusters and/or the final visualization to a computer system of the user who provided the Nth dataset 141, where the final set of clusters and the final visualization with respect to the different dataset, e.g., the Nth dataset 141, is different from the final set of clusters and the final visualization with respect to the first dataset 140. A different trained third unsupervised model may be also transmitted to the computer system of a user who provided the Nth dataset 141.

With continuing reference to FIG. 1A and further reference to FIG. 1B, the data segmentation system 100 may further include a clustering model selector 184. The clustering model selector 184 may receive the final result information and/or the user input for applying the clustering on the entire dataset. Based on the final result information, the clustering model selector 184 may select one from among the first unsupervised model 146, the second unsupervised model 148, and the trained third unsupervised model 180, for an execution of a corresponding clustering algorithm on the entirety of the first dataset 140.

The clustering applied by one from among the first unsupervised model 146, the second unsupervised model 148, and the trained third unsupervised model 180 on the entirety of the first dataset 140 replicates the clustering applied in the processing performed on the first sample dataset 144, where the final clusters and the final result information were obtained.

B. First and Second Visualizations

FIG. 2 depicts an example of the first visualization and the second visualization, according to embodiments.

In an example of FIG. 2, the first visualization 200 may be displayed on the UI 139. As shown by the first visualization 200, the first clustering subsystem 102 segmented the unique identifiers associated with the first sample dataset 144 into the first set of clusters 202 including 5 first clusters, each having a different count of the unique identifiers: 43, 28, 13, 7, and 2. For example, upon evaluation of the first visualization 200, the user provided an input for optimizing the first set of clusters 202 and provided a number K of clusters, e.g., K=3.

As described above, based on the user input requesting optimization and providing a number K, the second clustering subsystem 106 segments the unique identifiers associated with the first sample dataset 144 into the second set of clusters 204 including 3 second clusters, as depicted in the second visualization 206. For example, the second visualization 206 may be displayed on the UI 139.

As illustrated, first clusters 4 and 5 of the first set of clusters 202, which are shown in the first visualization 200, have very few members, e.g., the unique identifiers. As shown by the second visualization 206, the members of the first clusters 4 and 5 were reassigned to second clusters 2 and 3 of the second set of clusters.

However, the examples of the first visualization 200 and the second visualization 206 shown in FIG. 2 are not intended to be limiting. In certain implementations, the first visualization 200 and the second visualization 206 may be variously designed and implemented.

Figure 3:
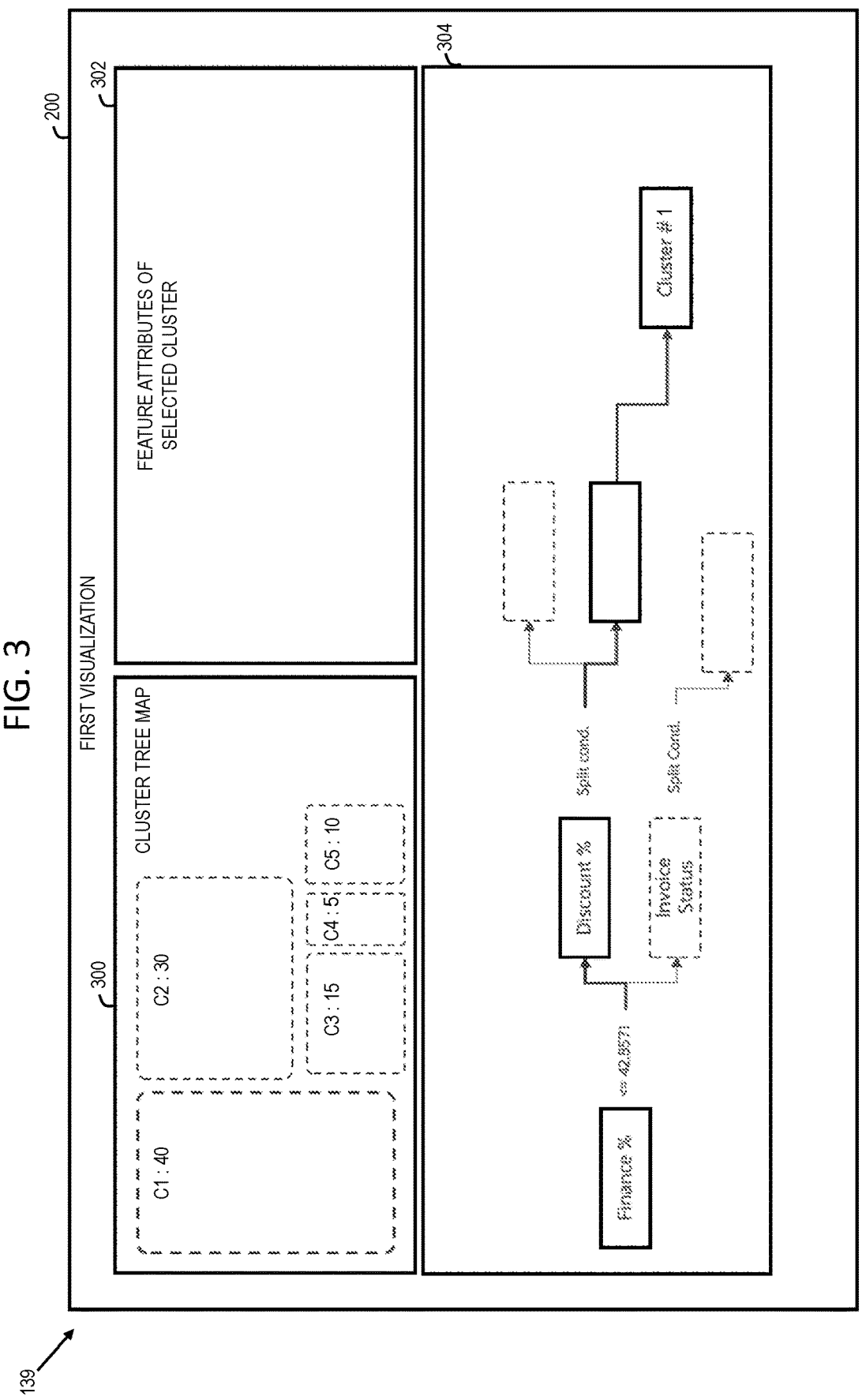
FIG. 3 illustrates an example of a first visualization, according to various embodiments.

FIG. 3 depicts an example of the first visualization, according to embodiments.

In an example of FIG. 3, the first visualization 200 may include a cluster tree map 300. The cluster tree map 300 may display 5 clusters of the first set of clusters 202, each having a different count of the unique identifiers, e.g., 40, 30, 15, 5, and 10.

The first visualization 200 may include an area 302 displaying feature attributes of the selected cluster. When one of the clusters is selected in the cluster tree map 300, the features of the cluster may be displayed in the area 302.

The first visualization 200 may further include an area 304 displaying the hierarchal split of the clusters. When one of the clusters is selected, e.g., "cluster #1," the path by which cluster #1 was derived may be emphasized as shown by solid lines in FIG. 3.

However, the example of the first visualization 200 shown in FIG. 3 is not intended to be limiting. In certain implementations, the first visualization 200 may be variously designed and implemented.

Figure 4:
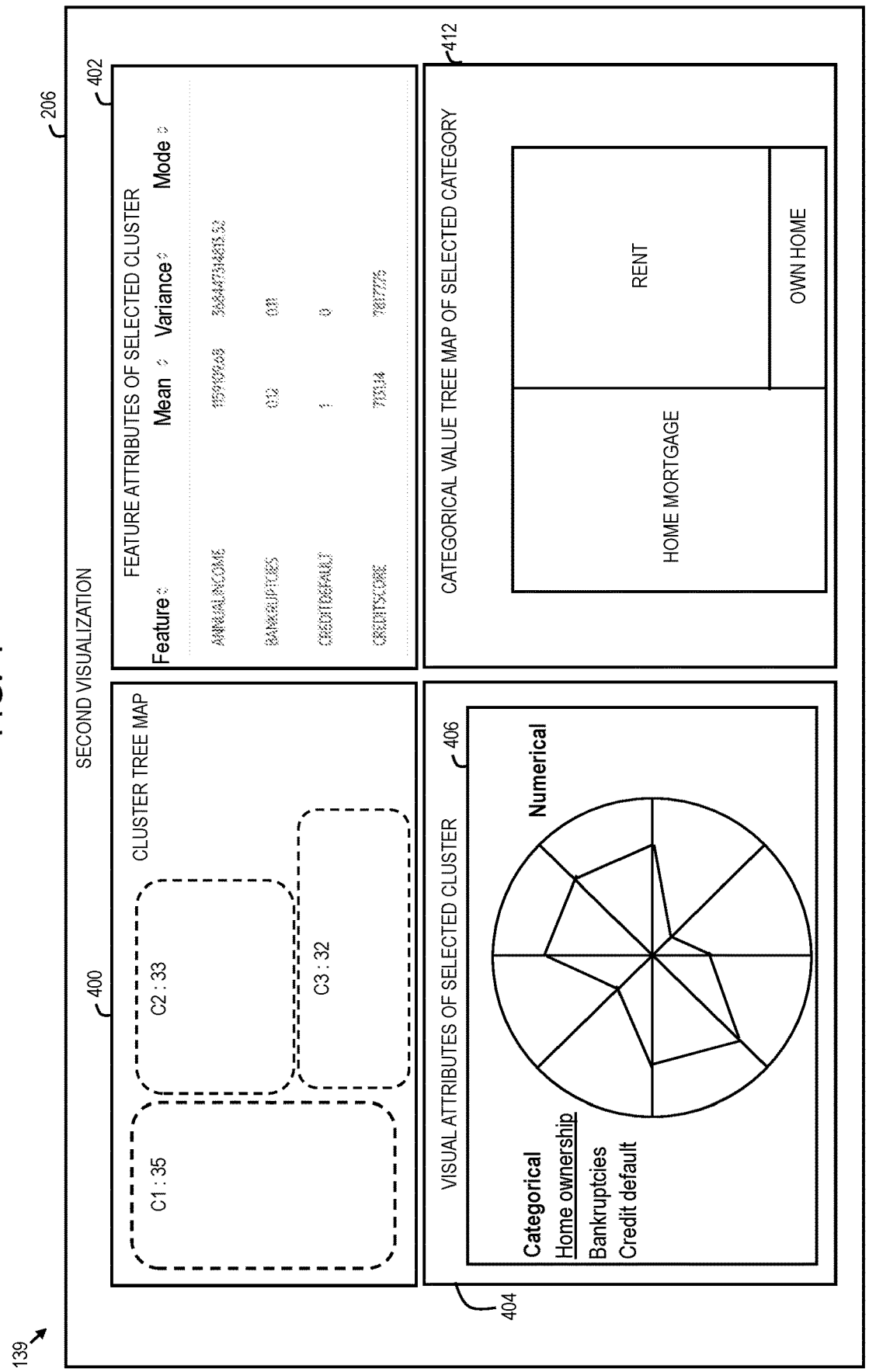
FIG. 4 illustrates an example of a second visualization, according to various embodiments.

FIG. 4 depicts an example of the second visualization, according to embodiments.

In an example of FIG. 4, the second visualization 206 may include a cluster tree map 400. The cluster tree map 400 may display 3 clusters of the second set of clusters 204, each having a different count of the unique identifiers assigned to a cluster, e.g., 35, 33, and 32. E.g., the first set of clusters 202 shown in FIG. 3 was optimized by the data segmentation system 100 to include 3 clusters with the same total count of the unique identifiers re-distributed among the 3 clusters.

The second visualization 206 may include an area 402 for displaying feature attributes of the selected cluster. When one of the clusters is selected in the cluster tree map 400, the feature attributes of the selected cluster may be displayed in the area 402.

The second visualization 206 may further include an area 404 for displaying visual attributes of the selected cluster. When one of the clusters is selected in the cluster tree map 400, a UI 406, e.g., a GUI, may display the visual attributes of the selected cluster. If the user selects (e.g., clicks on) on any listed "numerical" attribute, the numerical values are displayed within the UI 406. If the user selects (e.g., clicks on) any listed "categorical" attribute, identified by boxed labels, the corresponding details are displayed in categorical value tree map 412.

However, the example of the second visualization 206 shown in FIG. 4 is not intended to be limiting. In certain implementations, the second visualization 206 may be variously designed and implemented.

III. METHODS

Figure 5:
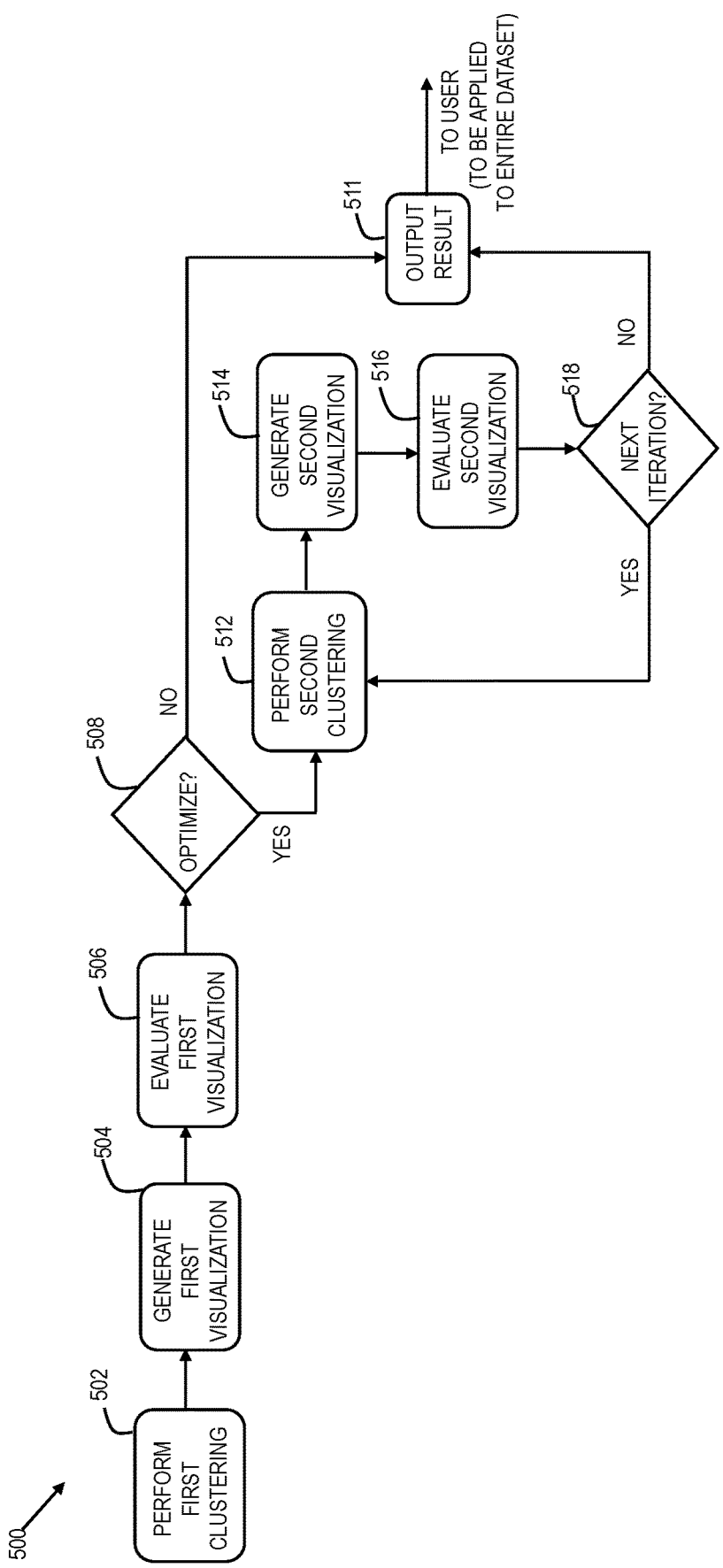
FIG. 5 depicts processing performed by the data segmentation system according to various embodiments.

FIG. 5 depicts processing according to various embodiments. For example, the processing 500 depicted in FIG. 5 may be performed by some or all of the first clustering subsystem 102, the data visualization subsystem 104, and the second clustering subsystem 106.

The processing 500 depicted in FIG. 5 may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing operations occurring in a particular sequence or order, this is not intended to be limiting. In certain alternative embodiments, the processing 500 may be performed in some different order or some operations may be performed at least partially in parallel.

With continuing reference to FIG. 5, at 502, the data segmentation system 100 can perform the first clustering, to obtain the first set of clusters 202.

At 504, the data segmentation system 100 can generate the first visualization 200.

At 506, the data segmentation system 100 can receive a user input (e.g., a control signal) indicating a result of evaluating the first visualization 200.

At 508, the data segmentation system 100 determines whether to perform optimization of the first set of clusters 202.

If the data segmentation system 100 determines at 508 to not perform the optimization of the first set of clusters 202, the processing 500 proceeds to 511.

If the data segmentation system 100 determines at 508 to perform the optimization of the first set of clusters, the processing 500 proceeds to 512.

At 512, the data segmentation system 100 can perform the second clustering, to obtain the second set of clusters 204.

At 514, the data segmentation system 100 can generate the second visualization 206.

At 516, the data segmentation system 100 can receive a user input (e.g., a control signal) indicating a result of evaluating the second visualization 206.

At 518, the data segmentation system 100 determines whether to perform further optimization of the second set of clusters 204.

If the data segmentation system 100 determines at 518 to perform the optimization of the second set of clusters 204, the processing 500 proceeds to 512, to perform the second clustering with the user input of K, and the operations 512 to 518 are iteratively repeated.

If the data segmentation system 100 determines at 518 to not perform the optimization of the second set of clusters 204, the processing 500 proceeds to 511.

At 511, the data segmentation system 100 may output the result information according to a particular version of the second set of clusters obtained in the second clustering, where the second visualization 206 of the particular version is considered to be the final visualization.

Figure 6:
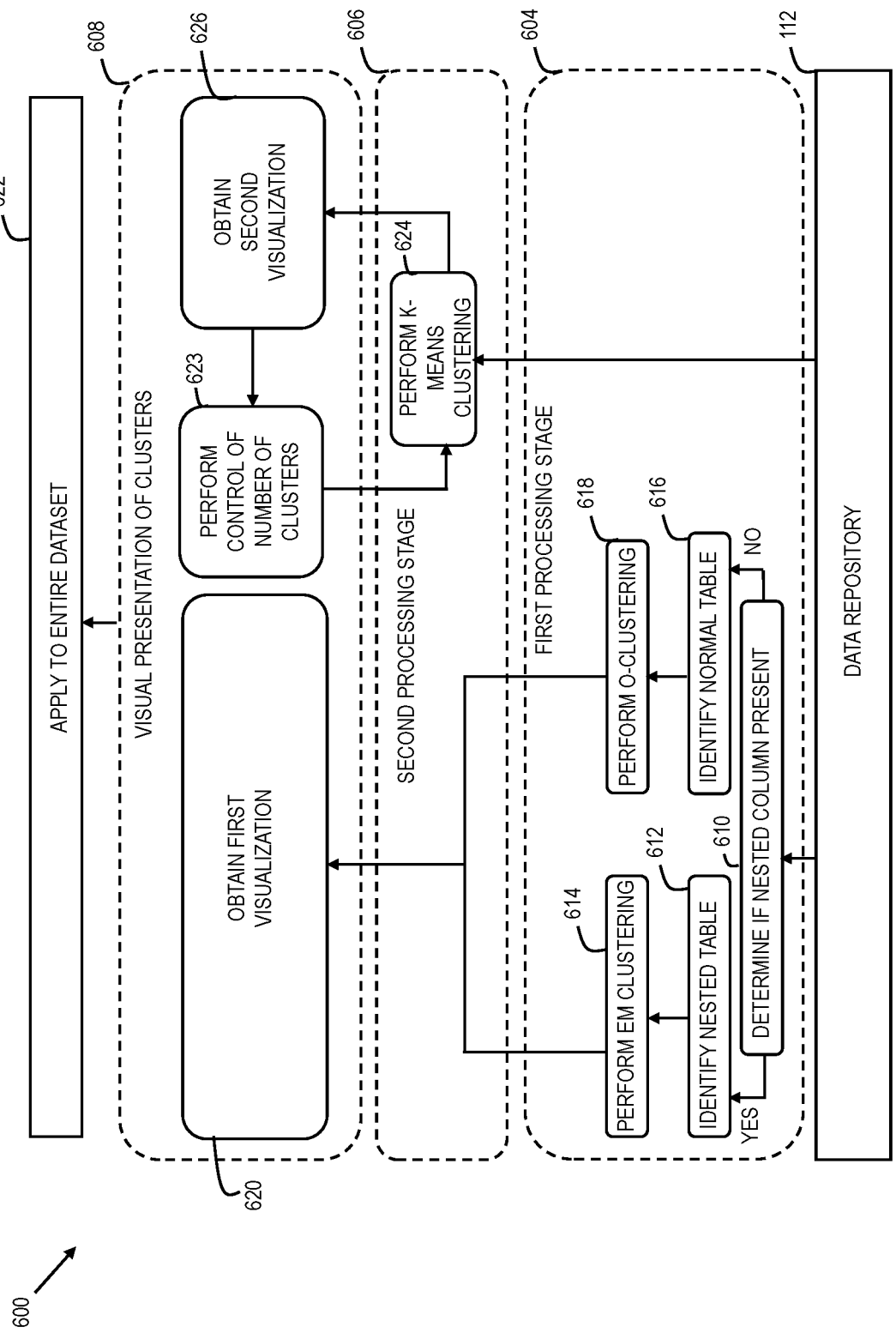
FIG. 6 depicts processing performed by the data segmentation system according to various embodiments.

FIG. 6 depicts a flowchart of a processing according to various embodiments. For example, the processing 600 depicted in FIG. 6 may be performed by some or all of the first clustering subsystem 102, the data visualization subsystem 104, and the second clustering subsystem 106.

The processing 600 depicted in FIG. 6 may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing operations occurring in a particular sequence or order, this is not intended to be limiting. In certain alternative embodiments, the processing 600 may be performed in some different order or some operations may be performed at least partially in parallel.

With continuing reference to FIG. 6, the data segmentation system 100 can perform processing 600 based on the sample data of the data repository 112 during at least some of a first processing stage 604, a second processing stage 606, and a visual presentation of clusters stage 608. At least some of the operations performed by the first processing stage 604 may correspond to the operations performed by the first clustering subsystem 102. At least some of the operations performed by the second processing stage 606 may correspond to the operations performed by the second clustering subsystem 106. At least some of the operations performed by the visual presentation of clusters stage 608 may correspond to the operations performed by the data visualization subsystem 104. The operations performed by the first clustering subsystem 102, the second clustering subsystem 106, and the data visualization subsystem 104 are described above.

During the first processing stage 604, the data segmentation system 100 extracts a sample of the first dataset 140 from the data repository 112, e.g., the first sample dataset 144, and can determine whether the first sample dataset 144 includes a nested column (operation 610).

If, at 610, it is determined that the first sample dataset 144 includes a nested column, the data segmentation system 100 identifies a nested table in the first sample dataset 144 (operation 612) and the processing 600 proceeds to 614.

At 614, the data segmentation system 100 segments the unique identifiers associated with the first sample dataset 144 into the first set of clusters 202 using the EM clustering algorithm.

If, at 610, it is determined that the first sample dataset 144 does not include a nested column, the data segmentation system 100 identifies a normal table in the first sample dataset 144 (operation 616) and the processing 600 proceeds to 618.

At 618, the data segmentation system 100 segments the unique identifiers associated with the first sample dataset 144 into the first set of clusters 202 using O-cluster algorithm.

The processing 600 then proceeds to the visual presentation of clusters stage 608.

At 620, the data segmentation system 100 obtains the first visualization 200.

As described above, based on the first visualization 200, it is determined, e.g., by the user, whether to optimize the first set of clusters 202 or not.

If it is determined to not optimize the first set of clusters 202, the data segmentation system 100 obtains and outputs the final result information according to the first processing stage 604 and the visual presentation of clusters stage 608. For example, the first visualization 200 is deemed to be the final visualization by the user, e.g., having the final clusters and attributes.

The processing 600 then proceeds to 622 where the clustering may be triggered to be applied to the entire dataset using the final result information output according to the first processing stage 604.

If it is determined to optimize the first set of clusters 202, the data segmentation system 100 performs processing corresponding to the second processing stage 606.

At 623, the data segmentation system 100 receives an input of the number of clusters, e.g., by allowing a user to provide a number of clusters, e.g., a number K.

At 624, the data segmentation system 100 segments the unique identifiers associated with the first sample dataset 144 into the second set of clusters 204 using K-means clustering and a number K.

The processing 600 then proceeds to the visual presentation of clusters stage 608.

At 626, the data segmentation system 100 obtains the second visualization 206.

As described above, based on the second visualization 206, it is determined, e.g., by the user, whether to further optimize the second set of clusters 204.

If it is determined to not further optimize the second set of clusters 204, the data segmentation system 100 obtains and outputs the final result information of the second processing stage 606 and/or the visual presentation of clusters stage 608, e.g., the second visualization 206 as the final visualization. The final result information may include information regarding a number of clusters used in K-means clustering.

At 622, the clustering may be triggered to be applied to the entire dataset using the final result information output according to the second processing stage 606. E.g., based on the final result information of the second processing stage 606, the K-means clustering can be applied to the entire first dataset 140 based on user-triggered action.

If it is determined to further optimize the second set of clusters 204, the processing 600 proceeds to 623.

At 623, the data segmentation system 100 receives an input of the number of clusters, e.g., by allowing a user to provide a different number of clusters to be used in the K-means clustering (operation 624).

At 624, the data segmentation system 100 segments the unique identifiers associated with the first sample dataset 144 into the second set of clusters 204 using K-means clustering with a K value, which is different from the previous iteration.

At 626, the data segmentation system 100 obtains the second visualization 206 based on the second set of clusters 204 of the current iteration.

As described above, based on the second visualization 206, it is determined whether to further optimize the second set of clusters 204.

If it is determined to further optimize the second set of clusters 204, the operations 623 to 626 are repeated.

If it is determined to not further optimize the second set of clusters 204, the data segmentation system 100 obtains and outputs the final result information of the second processing stage 606 and the visual presentation of clusters stage 608, e.g., the second visualization 206 as the final visualization, as described above.

The processing 600 then can proceed to 622.

FIG. 7A depicts processing according to various embodiments. For example, the processing 700 depicted in FIG. 7A may be performed by all or some of the first clustering subsystem 102, the data visualization subsystem 104, and the second clustering subsystem 106. The operations of FIG. 7A substantially correspond to all or some of the operations described above with reference to FIGS. 5 and 6.

The processing 700 depicted in FIG. 7A may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 7A and described below is intended to be illustrative and non-limiting. Although FIG. 7A depicts the various processing operations occurring in a particular sequence or order, this is not intended to be limiting. In certain alternative embodiments, the processing 700 may be performed in some different order or some operations may be performed at least partially in parallel.

With continuing reference to FIG. 7A, at 702, the data segmentation system 100 obtains sample records from the first dataset 140.

At 704, the data segmentation system 100 performs first clustering using the sample records to obtain the first set of clusters for the unique identifiers associated with the sample records, based on features associated with the unique identifiers.

Performing the first clustering includes identifying whether the sample records include at least one nested table; based on the identifying at least one nested column, applying EM clustering algorithm on the sample records; and based on identifying absence of the nested column, applying O-cluster algorithm on the sample records.

At 706, the data segmentation system 100 provides, on a display, a first visualization of the first set of clusters.

At 708, the data segmentation system 100 receives, through a user interface (UI), a user input.

At 710, the data segmentation system 100 determines whether the user input is for optimizing the first set of clusters.

At 712, the data segmentation system 100 determines first information related to the first set of clusters to be the final result information, when the user input is not for optimizing the first set of clusters.

When the user input is for optimizing the first set of clusters, then, at 714, the data segmentation system 100 performs second clustering using the sample records, to obtain the second set of clusters for the unique identifiers, the second clustering using the features, and determine second information related to the second clustering to be the final result information. The second set of clusters may be different from the first set of clusters, depending on the value of K provided by the user.

At 716, the data segmentation system 100 performs clustering on the entire first dataset 140 based on the final result information.

FIG. 7B depicts processing according to various embodiments. For example, the processing 720 depicted in FIG. 7B may be performed by all or some of the first clustering subsystem 102, the data visualization subsystem 104, and the second clustering subsystem 106. The operations of FIG. 7B substantially correspond to all or some of the operations described above with reference to FIGS. 5, 6, and 7A.

The processing 720 depicted in FIG. 7B may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 7B and described below is intended to be illustrative and non-limiting. Although FIG. 7B depicts the various processing operations occurring in a particular sequence or order, this is not intended to be limiting. In certain alternative embodiments, the processing 720 may be performed in some different order or some operations may be performed at least partially in parallel.

With continuing reference to FIG. 7B, at 722, the data segmentation system 100 obtains sample records from a dataset, to form a sample dataset, where the dataset is associated with a user and includes records arranged in a table, the records being associated with a plurality of unique identifiers corresponding to a plurality of customers of the user, respectively, where each of the plurality of unique identifiers is associated with features.

At 724, the data segmentation system 100 executes a first clustering algorithm using the sample records, to obtain a first set of clusters for first unique identifiers associated with the sample records among the plurality of unique identifiers, the first clustering algorithm using a plurality of features associated with the first unique identifiers.

The data segmentation system 100 executes the first clustering algorithm by identifying whether the sample dataset includes a nested table. Based on the identifying the nested table, expectation-maximization clustering algorithm is applied on the sample records, and, based on the identifying no nested table, O-cluster algorithm is applied on the sample records.

At 726, the data segmentation system 100 provides, on a display, a first visualization of the first set of clusters.

At 730, the data segmentation system 100 determines whether a user input for optimizing the first set of clusters provided in the first visualization is received through a user interface (UI).

If, at 730, it is determined that the user input for optimizing the first set of clusters is not received, then, at 732, the data segmentation system 100 determines first information related to the first set of clusters to be a final result information, and the processing proceeds to 736.

At 736, the data segmentation system 100 clusters an entirety of the dataset based on the final result information, e.g., the first information.

The first clustering algorithm (e.g., EM clustering or O-cluster) may be applied to the entirety of the dataset so that the clustering replicates an application of the first clustering algorithm on the sample dataset.

If, at 730, it is determined that the user input for optimizing the first set of clusters is received, then, at 734, the data segmentation system 100 executes a second clustering algorithm, which is different from the first clustering algorithm, using the sample records, to obtain a second set of clusters for the first unique identifiers, the second clustering algorithm using the plurality of features associated with the first unique identifiers, and determining second information related to the second set of clusters to be the final result information. The second set of clusters may have a fewer number of clusters than the first set of clusters and be obtained as a result of optimization of the first set of clusters.

The determining that the user input for optimizing the first set of clusters is received includes determining that the user input for optimizing the first set of clusters is received based on receiving the user input that provides a number K.

The executing the second clustering algorithm further includes applying K-means clustering using a number K.

The receiving the user input and the performing the K-means clustering are iteratively performed in execution of the second clustering algorithm, where, for each iteration, a different number K is received via the user input, a different number of clusters of the second set of clusters is obtained based on the number K input for a corresponding iteration, and a second visualization of the second set of clusters is provided on the display.

Further, for each iteration, it may be determined whether a user input for optimizing the second set of clusters provided in the second visualization and providing a number K is received through the UI. When the user input for optimizing the second set of clusters is received, the K-means clustering is applied again on the sample records using a number K provided for a current iteration, and the second visualization of the second set of clusters that is obtained in the current iteration is provided on the display. When the user input for optimizing the second set of clusters is not received, the second information related to the second set of clusters that is obtained in a most recent iteration is determined to be the final result information.

The second set of clusters obtained in a particular iteration (e.g., a most recent in time iteration) is determined to be a final version of the second set of clusters. Each cluster of the second set of clusters of the final version includes a number of the first unique identifiers, where the number of the first unique identifiers is optimized for each cluster of the second set of clusters of the final version to be approximately a same number.

At 736, the data segmentation system 100 clusters an entirety of the dataset based on the final result information, e.g., the second information.

The second clustering algorithm may be applied to the entirety of the dataset so that the clustering replicates an application of the second clustering algorithm on the sample dataset, where a number of the plurality of unique identifiers in each cluster is approximately the same.

The data obtained as a result of the data segmentation according to the described techniques may be used to align clusters with the objectives and/or tasks of the users (e.g., banks, medical institutions, etc.). However, this is not intended to be limiting. The techniques described herein may be used for other applications for practical and accurate data segmentation by using clustering based on various scenarios.

Example Cloud Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
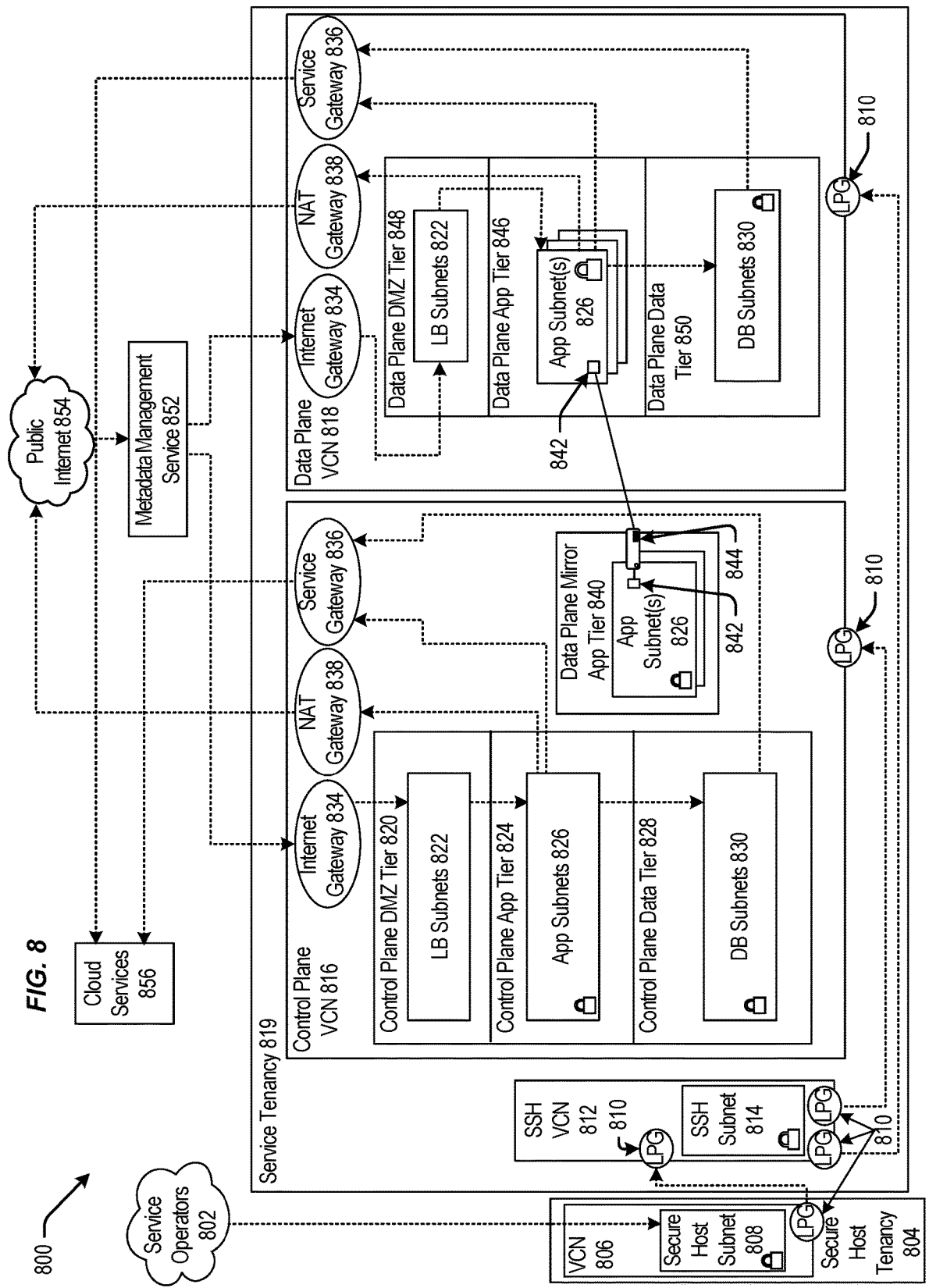
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
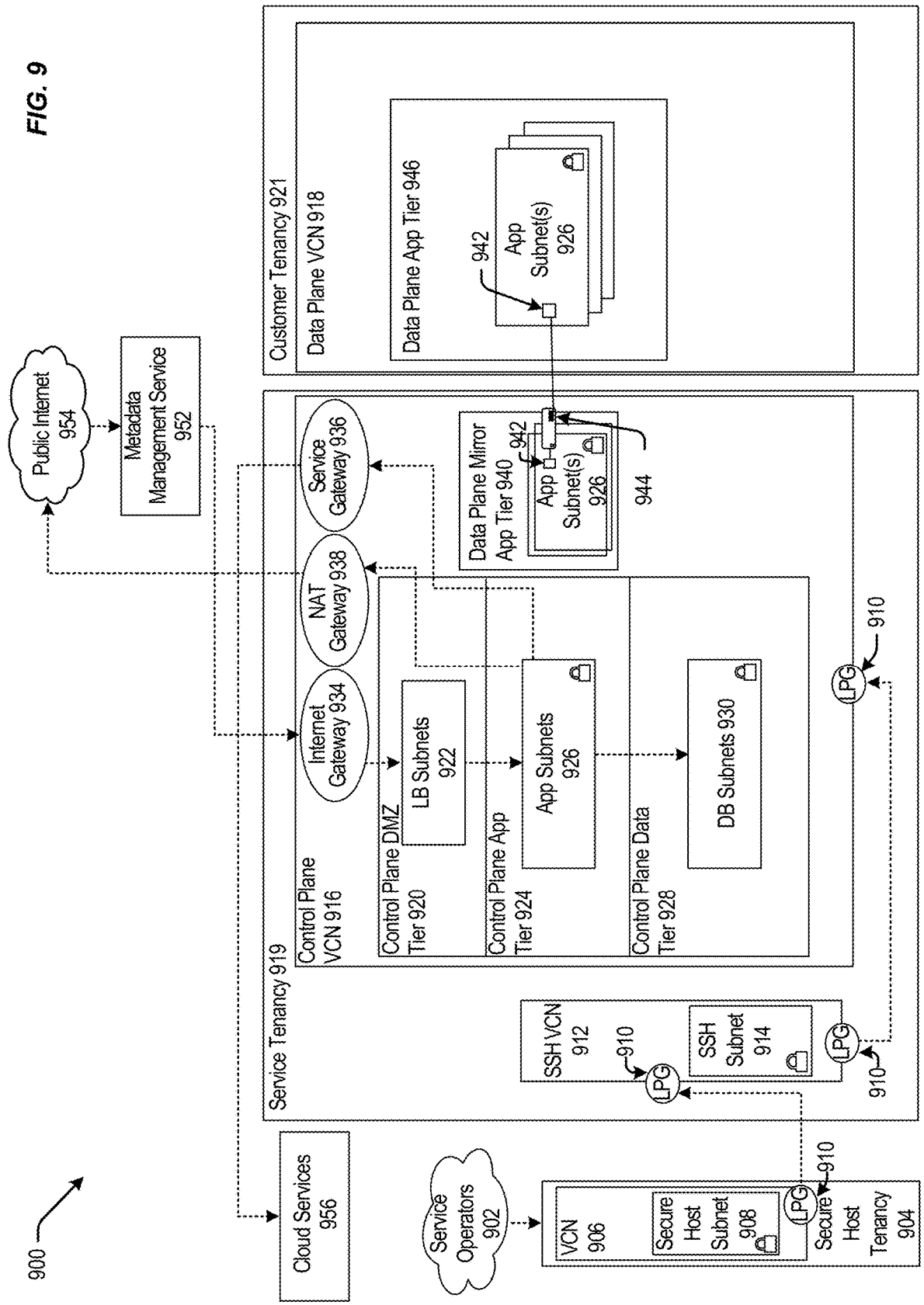
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
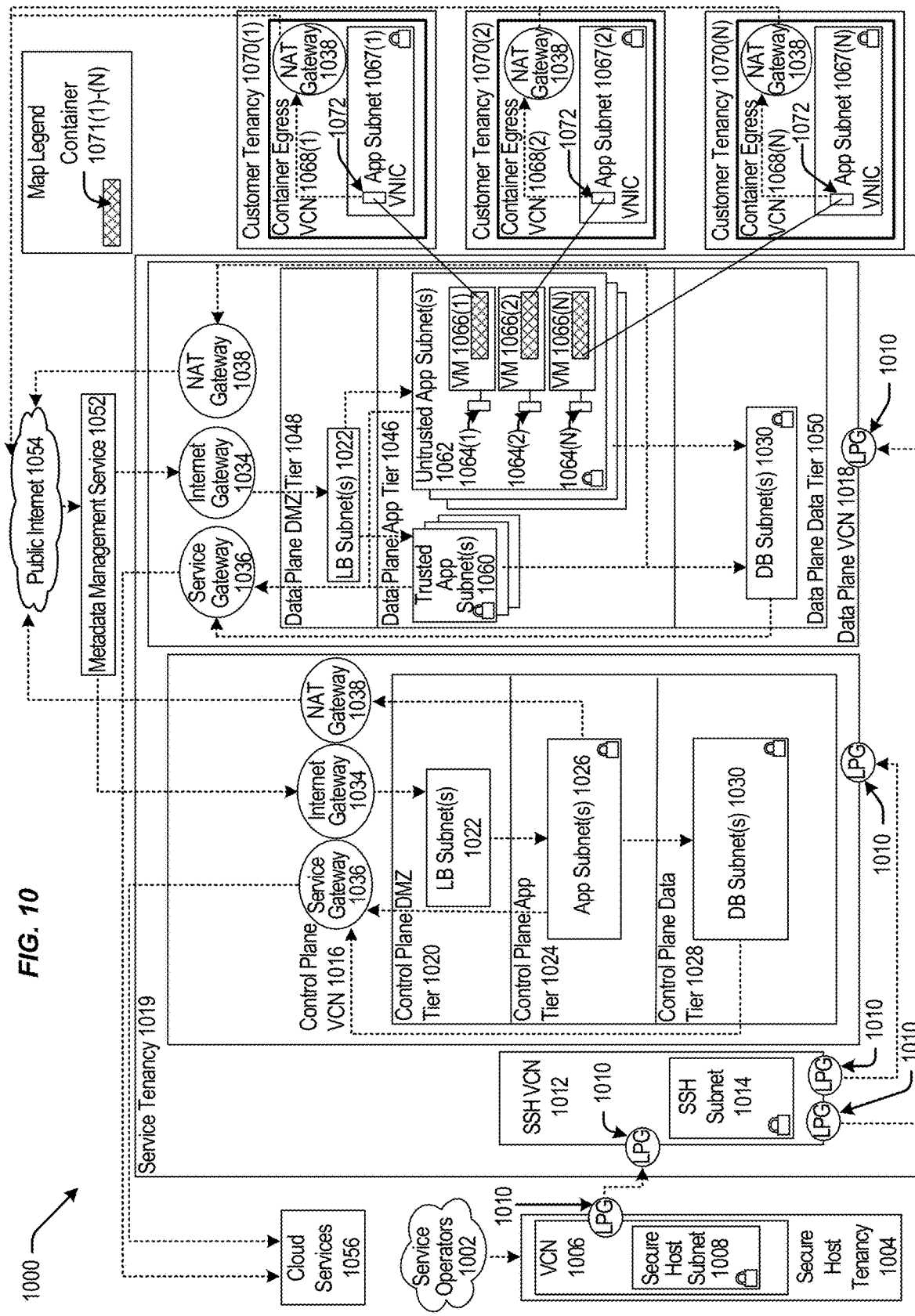
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management service 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071 (1)-(N) may be communicatively coupled to the customer tenancy 1070 and may be configured to transmit or receive data from the customer tenancy 1070. The containers 1071 (1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
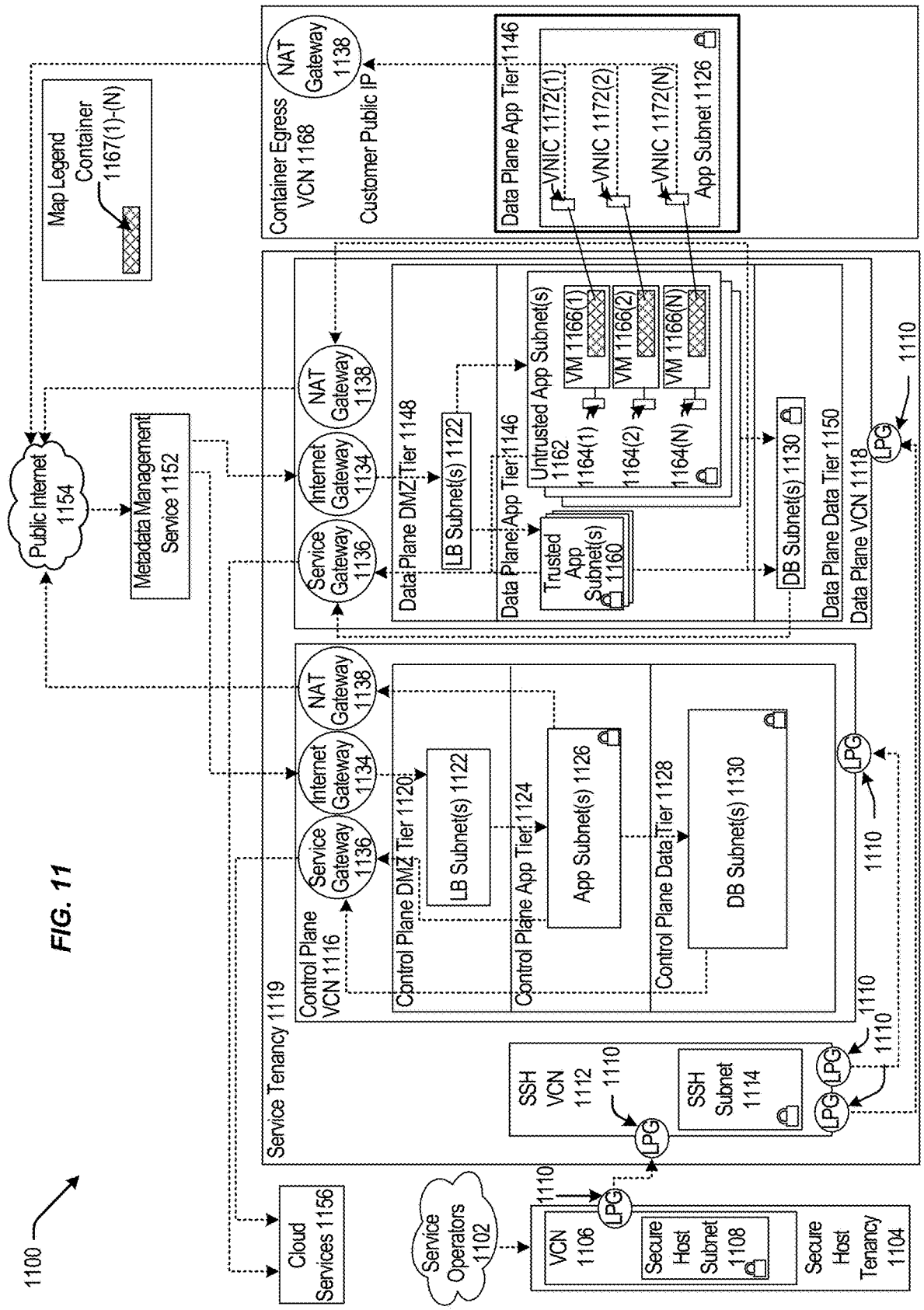
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management service 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 12 illustrates an example computer system 1200, in which various embodiments may be implemented. The computer system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may include a storage subsystem 1218 that includes software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1218 may also provide a tangible computer-readable storage medium for storing the basic programming and data constructs that provide the functionality of some embodiments. Software (programs, code services, instructions) that when executed by a processor provide the functionality described above may be stored in storage subsystem 1218. These software services or instructions may be executed by processing unit 1204. Storage subsystem 1218 may also provide a repository for storing data used in accordance with the present disclosure.

Storage subsystem 1218 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1200.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments, communications subsystem 1224 can include radio frequency (RF) transceiver components for accessing wireless voice and/or data networks (e.g., using cellular telephone technology, advanced data network technology, such as 3G, 4G, 5G or EDGE (enhanced data rates for global evolution), WiFi (IEEE 802.11 family standards, or other mobile communication technologies, or any combination thereof)), global positioning system (GPS) receiver components, and/or other components. In some embodiments, communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "including," "having," "including," and "containing" are to be construed as open-ended terms (i.e., meaning "including, but not limited to,") unless otherwise noted. The term "connected" is to be construed as a partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method performed by a computer system, the computer-implemented method comprising:
    obtaining, by a processor of the computer system, sample records from a dataset, to form a sample dataset comprising the sample records constituting a fraction of records included in the dataset, wherein the dataset is associated with a user, the records are associated with a plurality of unique identifiers respectively corresponding to a plurality of customers of the user, and each of the plurality of unique identifiers is associated with features;
    executing, by the processor, a first clustering algorithm using the sample records, to obtain a first set of clusters for first unique identifiers associated with the sample records among the plurality of unique identifiers, the first clustering algorithm using a plurality of features associated with the first unique identifiers;
    providing, by the processor, on a display, a first visualization of the first set of clusters for the user to identify whether to perform an optimization for the first set of clusters;
    determining, by the processor, whether a user input for optimizing the first set of clusters provided in the first visualization is received through a user interface (UI);
    when the user input for optimizing the first set of clusters is not received, determining, by the processor, first information related to the first set of clusters to be a final result information, the first information indicating that an entirety of the dataset is to be clustered based on the first clustering algorithm;
    when the user input for optimizing the first set of clusters is received, optimizing, by the processor, the first set of clusters, the optimizing comprising:
        executing a second clustering algorithm, which is different from the first clustering algorithm, using the sample records, to obtain a second set of clusters for the first unique identifiers, the second clustering algorithm using the plurality of features associated with the first unique identifiers, wherein the second set of clusters has a fewer number of clusters than the first set of clusters, and
        determining, by the processor, second information related to the second set of clusters to be the final result information, the second information indicating that the entirety of the dataset is to be clustered based on the second clustering algorithm;
    clustering, by the processor, the entirety of the dataset based on the final result information,
    wherein the clustering the entirety of the dataset comprises:
        when the final result information corresponds to the first information, applying the first clustering algorithm on the entirety of the dataset, wherein an application of the first clustering algorithm on the entirety of the dataset replicates an application of the first clustering algorithm on the sample dataset, and
        when the final result information corresponds to the second information, applying the second clustering algorithm on the entirety of the dataset, wherein an application of the second clustering algorithm on the entirety of the dataset replicates an application of the second clustering algorithm on the sample dataset; and
    providing, by the processor, a result of the clustering of the entirety of the dataset to an external computer.

2. The computer-implemented method of claim 1, wherein the executing the first clustering algorithm further comprises:
    identifying whether the sample dataset includes a nested table;
    based on the identifying the nested table, applying expectation-maximization clustering algorithm on the sample records; and
    based on the identifying no nested table, applying O-cluster algorithm on the sample records.

3. The computer-implemented method of claim 1, wherein:
    the providing the first visualization further comprises receiving, through the UI, the user input that provides a number K, the determining whether the user input for optimizing the first set of clusters is received further comprises determining that the user input is received for optimizing the first set of clusters based on the number K, and the executing the second clustering algorithm comprises applying K-means clustering using the number K.

4. The computer-implemented method of claim 3, wherein:

the receiving the user input and the applying the K-means clustering are iteratively performed, and for each iteration, the computer-implemented method further comprises:

receiving a number K, via the user input, the number K being different for each iteration, obtaining a number of clusters for the second set of clusters based on the number K that is input for a corresponding iteration, and providing, on the display, a second visualization of the second set of clusters.

5. The computer-implemented method of claim 4, further comprising:

for each iteration, determining whether a user input for optimizing the second set of clusters provided in the second visualization is received through the UI;

when the user input for optimizing the second set of clusters is received, applying the K-means clustering on the sample records using a number K provided for a current iteration, and providing, on the display, the second visualization of the second set of clusters that is obtained in the current iteration; and when the user input for optimizing the second set of clusters is not received, determining the second information related to the second set of clusters that is obtained in a most recent iteration to be the final result information.

6. The computer-implemented method of claim 4, further comprising:

determining the second set of clusters obtained in a particular iteration as a final version of the second set of clusters, wherein:

each cluster of the second set of clusters of the final version includes a number of the first unique identifiers, the number of the first unique identifiers is optimized for each cluster of the second set of clusters of the final version to be approximately a same number, and the second clustering algorithm applied to the entirety of the dataset replicates an application of the second clustering algorithm on the sample dataset so that a number of the plurality of unique identifiers in each cluster is approximately the same.

7. A system comprising:

one or more data processors; and one or more non-transitory computer-readable media storing instructions that, when executed by the one or more data processors, cause the one or more data processors to perform a method including:

obtaining sample records from a dataset, to form a sample dataset comprising the sample records constituting a fraction of records included in the dataset, wherein the dataset is associated with a user, the records are associated with a plurality of unique identifiers respectively corresponding to a plurality of customers of the user, and each of the plurality of unique identifiers is associated with features;

executing a first clustering algorithm using the sample records, to obtain a first set of clusters for first unique identifiers associated with the sample records among the plurality of unique identifiers, the first clustering algorithm using a plurality of features associated with the first unique identifiers;

providing, on a display, a first visualization of the first set of clusters; for the user to identify whether to perform an optimization for the first set of clusters;

determining whether a user input for optimizing the first set of clusters provided in the first visualization is received through a user interface (UI);

when the user input for optimizing the first set of clusters is not received, determining first information related to the first set of clusters to be a final result information, the first information indicating that an entirety of the dataset is to be clustered based on the first clustering algorithm;

when the user input for optimizing the first set of clusters is received, optimizing the first set of clusters, the optimizing including:

executing a second clustering algorithm, which is different from the first clustering algorithm, using the sample records, to obtain a second set of clusters for the first unique identifiers, the second clustering algorithm using the plurality of features associated with the first unique identifiers, wherein the second set of clusters has a fewer number of clusters than the first set of clusters, and determining second information related to the second set of clusters to be the final result information, the second information indicating that the entirety of the dataset is to be clustered based on the second clustering algorithm;

clustering the entirety of the dataset based on the final result information, wherein the clustering the entirety of the dataset includes:

when the final result information corresponds to the first information, applying the first clustering algorithm on the entirety of the dataset, wherein an application of the first clustering algorithm on the entirety of the dataset replicates an application of the first clustering algorithm on the sample dataset, and when the final result information corresponds to the second information, applying the second clustering algorithm on the entirety of the dataset, wherein an application of the second clustering algorithm on the entirety of the dataset replicates an application of the second clustering algorithm on the sample dataset; and providing a result of the clustering of the entirety of the dataset to an external computer.

8. The system of claim 7, wherein the executing the first clustering algorithm further includes:

identifying whether the sample dataset includes a nested table;

based on the identifying the nested table, applying expectation-maximization clustering algorithm on the sample records; and based on the identifying no nested table, applying O-cluster algorithm on the sample records.

9. The system of claim 7, wherein:

the providing the first visualization further includes receiving, through the UI, the user input that provides a number K, the determining whether the user input for optimizing the first set of clusters is received further includes determining that the user input is received for optimizing the first set of clusters based on the number K, and the executing the second clustering algorithm includes applying K-means clustering using the number K.

10. The system of claim 9, wherein:

the receiving the user input and the applying the K-means clustering are iteratively performed, and for each iteration, the method further includes:
receiving a number K, via the user input, the number K being different for each iteration,
obtaining a number of clusters for the second set of clusters based on the number K that is input for a corresponding iteration, and
providing, on the display, a second visualization of the second set of clusters.

11. The system of claim 10, wherein the method further includes:

for each iteration, determining whether a user input for optimizing the second set of clusters provided in the second visualization is received through the UI;

when the user input for optimizing the second set of clusters is received, applying the K-means clustering on the sample records using a number K provided for a current iteration, and providing, on the display, the second visualization of the second set of clusters that is obtained in the current iteration; and when the user input for optimizing the second set of clusters is not received, determining the second information related to the second set of clusters that is obtained in a most recent iteration to be the final result information.

12. The system of claim 9, wherein the method further includes:

determining the second set of clusters obtained in a particular iteration as a final version of the second set of clusters, wherein:
each cluster of the second set of clusters of the final version includes a number of the first unique identifiers,
the number of the first unique identifiers is optimized for each cluster of the second set of clusters of the final version to be approximately a same number, and
the second clustering algorithm applied to the entirety of the dataset replicates an application of the second clustering algorithm on the sample dataset so that a number of the plurality of unique identifiers in each cluster is approximately the same.

13. A computer-program product tangibly embodied in one or more non-transitory machine-readable media including instructions configured to cause one or more data processors of a computer system to perform a method including:

obtaining sample records from a dataset, to form a sample dataset comprising the sample records constituting a fraction of records included in the dataset, wherein the dataset is associated with a user, the records are associated with a plurality of unique identifiers respectively corresponding to a plurality of customers of the user, and each of the plurality of unique identifiers is associated with features;

executing a first clustering algorithm using the sample records, to obtain a first set of clusters for first unique identifiers associated with the sample records among the plurality of unique identifiers, the first clustering algorithm using a plurality of features associated with the first unique identifiers;

providing, on a display, a first visualization of the first set of clusters; for the user to identify whether to perform an optimization for the first set of clusters;

determining whether a user input for optimizing the first set of clusters provided in the first visualization is received through a user interface (UI);

when the user input for optimizing the first set of clusters is not received, determining first information related to the first set of clusters to be a final result information, the first information indicating that an entirety of the dataset is to be clustered based on the first clustering algorithm;

when the user input for optimizing the first set of clusters is received, optimizing the first set of clusters, the optimizing including:
executing a second clustering algorithm, which is different from the first clustering algorithm, using the sample records, to obtain a second set of clusters for the first unique identifiers, the second clustering algorithm using the plurality of features associated with the first unique identifiers, wherein the second set of clusters has a fewer number of clusters than the first set of clusters, and
determining second information related to the second set of clusters to be the final result information, the second information indicating that the entirety of the dataset is to be clustered based on the second clustering algorithm;

clustering the entirety of the dataset based on the final result information, wherein the clustering the entirety of the dataset includes:
when the final result information corresponds to the first information, applying the first clustering algorithm on the entirety of the dataset, wherein an application of the first clustering algorithm on the entirety of the dataset replicates an application of the first clustering algorithm on the sample dataset, and
when the final result information corresponds to the second information, applying the second clustering algorithm on the entirety of the dataset, wherein an application of the second clustering algorithm on the entirety of the dataset replicates an application of the second clustering algorithm on the sample dataset; and providing a result of the clustering of the entirety of the dataset to an external computer.

14. The computer-program product of claim 13, wherein the executing the first clustering algorithm further includes:

identifying whether the sample dataset includes a nested table;

based on the identifying the nested table, applying expectation-maximization clustering algorithm on the sample records; and based on the identifying no nested table, applying O-cluster algorithm on the sample records.

15. The computer-program product of claim 13, wherein:

the providing the first visualization further includes receiving, through the UI, the user input that provides a number K, the determining whether the user input for optimizing the first set of clusters is received further includes determining that the user input is received for optimizing the first set of clusters based on the number K, and the executing the second clustering algorithm includes applying K-means clustering using the number K.

16. The computer-program product of claim 15, wherein:
the receiving the user input and the applying the K-means clustering are iteratively performed, and
for each iteration, the method further includes:
  receiving a number K, via the user input, the number K being different for each iteration,
  obtaining a number of clusters for the second set of clusters based on the number K that is input for a corresponding iteration, and
  providing, on the display, a second visualization of the second set of clusters.

17. The computer-program product of claim 16, wherein the method further includes:
for each iteration, determining whether a user input for optimizing the second set of clusters provided in the second visualization is received through the UI;
when the user input for optimizing the second set of clusters is received, applying the K-means clustering on the sample records using a number K provided for a current iteration, and providing, on the display, the second visualization of the second set of clusters that is obtained in the current iteration; and
when the user input for optimizing the second set of clusters is not received, determining the second information related to the second set of clusters that is obtained in a most recent iteration to be the final result information.

\* \* \* \* \*